(12) United States Patent
Karlsson et al.

(10) Patent No.: US 10,846,755 B1
(45) Date of Patent: Nov. 24, 2020

(54) SYSTEMS AND METHODS FOR GENERATING A RESPONSE FUNCTION IN ONLINE ADVERTISING CAMPAIGNS

(71) Applicant: OATH (AMERICAS) INC., New York, NY (US)

(72) Inventors: Niklas Karlsson, Mountain View, CA (US); Mohammad Ziaemohseni, Palo Alto, CA (US); Qixing Zheng, Mountain View, CA (US)

(73) Assignee: Verizon Media Inc., New York, NY (US)

( * ) Notice: Subject to any disclaimer, the term of this patent is extended or adjusted under 35 U.S.C. 154(b) by 213 days.

(21) Appl. No.: 15/438,607

(22) Filed: Feb. 21, 2017

(51) Int. Cl.
   *G06Q 30/00* (2012.01)
   *G06Q 30/02* (2012.01)

(52) U.S. Cl.
   CPC ..... *G06Q 30/0275* (2013.01); *G06Q 30/0242* (2013.01)

(58) Field of Classification Search
   None
   See application file for complete search history.

(56) References Cited

U.S. PATENT DOCUMENTS

| | | | |
|---|---|---|---|
| 7,835,937 B1 | 11/2010 | Karlsson et al. | |
| 8,098,569 B2 * | 1/2012 | Laroia | H04L 5/023 370/208 |
| 2001/0034704 A1 * | 10/2001 | Farhat | G06Q 30/06 705/39 |
| 2003/0014584 A1 * | 1/2003 | Kodanna | G06F 3/0613 711/112 |
| 2006/0011837 A1 * | 1/2006 | Jee | G21K 7/00 250/311 |
| 2008/0046316 A1 * | 2/2008 | Shah | G06Q 30/02 705/14.43 |
| 2008/0091678 A1 * | 4/2008 | Walker | G06T 7/30 |
| 2008/0270223 A1 | 10/2008 | Collins et al. | |
| 2010/0262455 A1 | 10/2010 | Karlsson et al. | |

(Continued)

OTHER PUBLICATIONS

Bowei; Risk-Aware Dynamic Reserve Prices of Pr..IEEE 2016; pp. 511-512; 2016.*

(Continued)

*Primary Examiner* — Radu Andrei
(74) *Attorney, Agent, or Firm* — Cooper Legal Group, LLC

(57) ABSTRACT

A method for monitoring an advertising campaign is disclosed and includes receiving a campaign transaction signal, generating a discrete function based on the signal, and generating a continuous function based on the discrete function. The signal indicates a price and an event rate for impressions in the campaign. The discrete function indicates a discrete cumulative distribution of the impressions. The price dimension corresponds to an impression price independent variable. The event rate dimension corresponds to an event rate independent variable. The price dimension and the rate dimension are segmented into a plurality of bins based on threshold values. The continuous function indicates a continuous cumulative distribution of the impressions and is continuous in the price dimension and the rate dimension. The response function is also a continuous function. The response function is a function of control variable that parameterizes a correspondence between the price and event rate variables.

20 Claims, 12 Drawing Sheets

(56) References Cited

U.S. PATENT DOCUMENTS

| | | | |
|---|---|---|---|
| 2011/0270675 A1 | 11/2011 | Veach | |
| 2013/0245847 A1* | 9/2013 | Steven | G06Q 10/00 |
| | | | 700/291 |
| 2013/0346218 A1* | 12/2013 | Liu | G06Q 30/02 |
| | | | 705/14.71 |
| 2014/0104622 A1* | 4/2014 | Geminiani | B60S 3/04 |
| | | | 356/612 |
| 2015/0088783 A1* | 3/2015 | Mun | G06Q 40/08 |
| | | | 705/36 R |
| 2016/0162934 A1* | 6/2016 | Sega | H04L 67/16 |
| | | | 705/14.46 |
| 2017/0193561 A1* | 7/2017 | Shen | G06Q 30/0275 |

OTHER PUBLICATIONS

Kridel; Adaptive Modeling for Real Time Analyti..Conf System Science; 2015; pp. 887-896; 2015.*

Final Office Action dated Jul. 29, 2016 in U.S. Appl. No. 13/416,796, 15 pages.

Non-Final Office Action dated Nov. 23, 2015 in U.S. Appl. No. 13/416,796, 16 pages.

Final Office Action dated Apr. 22, 2015 in U.S. Appl. No. 13/416,796, 13 pages.

Non-Final Office Action dated Sep. 24, 2014 in U.S. Appl. No. 13/416,796, 12 pages.

* cited by examiner

```
function tacticPV = fAdaptivePriceEventRateGenerator ()

priceLow = configParams.priceLow;                              ⎫
  priceHigh = configParams.priceHigh;                            ⎬ Domain-Bounding
  eventRateLow = configParams.eventRateLow;                      ⎪ Configuration
  eventRateHigh = configParams.eventRateHigh;                    ⎭ Parameters
  minDeltaPrice = configParams.terminationCriteria.minDeltaPrice;       ⎫
  minDeltaEventRate = configParams.terminationCriteria.minDeltaEventRate; ⎬ Threshold
  maxRelDeltaVolume = configParams.terminationCriteria.maxRelDeltaVolume; ⎪ Configuration
  minDeltaVolume = configParams.terminationCriteria.minDeltaVolume;     ⎭ Parameters tacticPV.priceSet = [];          ⎫
  tacticPV.eventRateSet = [];      ⎬ Initialize Bins and
  tacticPV.volumeSet = [];         ⎭ Discrete Function tacticPV = fAdaptivePVcurve(tacticPV, priceLow, priceHigh, eventRateLow, eventRateHigh,....

function tacticPV = fAdaptivePVcurve(tacticPV, priceLow, priceHigh, eventRateLow, eventRateHigh....
    minDeltaPrice, minDeltaEventRate, maxRelDeltaVolume, minDeltaVolume, volumeLow, volumeHigh,....
    lowFlag, highFlag)

if ~lowFlag
    volumeLow = fTacticVolume(priceLow, eventRateLow);           ⎫ Determine Discrete
  end                                                            ⎬ Function Values at
  if ~highFlag                                                   ⎪ Boundaries of Sub-
    volumeHigh = fTacticVolume(priceHigh, eventRateHigh);        ⎭ Domain
  end deltaPrice = priceHigh-priceLow;                               ⎫
  deltaEventRate = eventRateHigh-eventRateLow;                   ⎬ Determine Sub-Domain
  deltaVolume = volumeHigh-volumeLow;                            ⎭ and Function Variances if deltaVolume <= (volumeLow*maxRelDeltaVolume) || deltaVolume <= minDeltaVolume....        ⎫
     || deltaPrice <= minDeltaPrice || deltaEventRate <= minDeltaEventRate                    ⎪ Generate Bin and
    tacticPV.priceSet = [tacticPV.priceSet, priceLow, priceHigh];                             ⎬ Function Value for Bin
    tacticPV.eventRateSet = [tacticPV.eventRateSet, eventRateLow, eventRateHigh];             ⎪ (Termination Criteria)
    tacticPV.volumeSet = [tacticPV.volumeSet, volumeLow, volumeHigh];                         ⎭
  else
    tacticPV = fAdaptivePVcurve(tacticPV, priceLow, 0.5*(priceLow+priceHigh), eventRateLow, 0.5*(eventRateLow+eventRateHigh),....    ⎫
      minDeltaPrice, minDeltaEventRate, maxRelDeltaVolume, minDeltaPrice, volumeLow, [], true, false);                                ⎪
    tacticPV = fAdaptivePVcurve(tacticPV, 0.5*(priceLow+priceHigh), priceHigh, eventRateLow, 0.5*(eventRateLow+eventRateHigh),....    ⎪
      minDeltaPrice, minDeltaEventRate, maxRelDeltaVolume, minDeltaVolume, [], [], false, false);                                     ⎬ Recursively
    tacticPV = fAdaptivePVcurve(tacticPV, priceLow, 0.5*(priceLow+priceHigh), 0.5*(eventRateLow+eventRateHigh), eventRateHigh,....    ⎪ Segment
      minDeltaPrice, minDeltaEventRate, maxRelDeltaVolume, minDeltaVolume, [], [], false, false);                                     ⎪ Sub-Domain
    tacticPV = fAdaptivePVcurve(tacticPV, 0.5*(priceLow+priceHigh), priceHigh, 0.5*(eventRateLow+eventRateHigh), eventRateHigh,....   ⎭
      minDeltaPrice, minDeltaEventRate, maxRelDeltaVolume, minDeltaVolume, [], volumeHigh, false, true);
  end
end
```

Fig. 5C

SYSTEMS AND METHODS FOR GENERATING A RESPONSE FUNCTION IN ONLINE ADVERTISING CAMPAIGNS

TECHNICAL FIELD

The present disclosure relates generally to online advertising. More specifically, and without limitation, the present disclosure relates to systems and methods for monitoring, controlling, and/or optimizing performance in online advertising campaigns.

BACKGROUND

Online marketers are interested in placing impressions, such as messages and/or other content, on websites to promote their products or services. At least a portion of the content may be viewed by the user. Influenced by the viewable content, a user may perform a click based on the content or take another action, such as completing an online form to request additional information with regard to the associated product or service. The impression may be associated with an event, such as an action event, if the user makes a purchase of the product or service. In general, online marketers pay based on, for example, the impressions, clicks, or conversions over the course of a marketing campaign, hereinafter merely referred to as an "online campaign," or simply a "campaign."

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In accordance with various embodiments of the present disclosure, computer-implemented methods and systems are disclosed. The methods and systems may be employed in the monitoring, controlling, and/or optimizing performance in advertising campaigns. At least one method includes the steps or operations of receiving a signal, recursively generating a discrete function based on the signal, generating a continuous function based on the discrete function, and generating a response function based on the continuous function. The signal may indicate at least a price and an event rate for each of a plurality of transactions in the advertising campaign. Thus, the signal may be a campaign transaction signal. The transactions may include previously awarded impressions.

The discrete function may indicate and/or provide a discrete distribution of the transactions in a price dimension and an event rate dimension. The discrete distribution may be a cumulative distribution. In other embodiments, the discrete distribution is a distribution density. Thus, the discrete function mar be a function of price independent variable and an event rate independent variable. The price dimension corresponds to the price for each of the transactions. The event rate dimension corresponds to an event rate for the transactions. Each of the price dimension and the rate dimension may be segmented into a plurality of bins based on one or more threshold values. The continuous function indicates a continuous distribution corresponding to the discrete distribution of the transactions and is continuous in each of the price dimension and the rate dimension. The continuous distribution may be a cumulative distribution. In other embodiments, the continuous distribution is a distribution density. The response function may also be a continuous function. The response function may be a function of a control parameter that generates a relationship and/or a correspondence between the price dimension and the event rate dimension.

The method may further include temporally filtering the discrete function, determining one or more splines, and generating the continuous function further based on the one or more splines. The splines may be based on the temporally filtered discrete function. In some embodiments, the method includes determining a domain of the discrete function, recursively segmenting e domain into a plurality of sub-domains generating a plurality of bins, and generating the discrete function based on the bins. Segmenting the domains may be based on the one or more threshold values and a variance in the volume of the transactions across the sub-domains. The bins may segment each of the price and event rate dimensions based on the boundaries of the plurality of sub-domains.

In other embodiments, the methods include temporally filtering a current portion of the signal and updating the discrete function based on the temporally filtered current portion of the signal. Temporally filtering the current portion of the signal may be based on a previously received portion of the signal. For instance, the current portion of the signal may correspond to a recent temporal sample of the signal and the previously received portion of the signal may be a previous temporal sample of the signal.

In various embodiments, the relationship between the price dimension and the rate dimension encodes information that can be used with respect to a specific bidding strategy employed in the advertising campaign. In at least one embodiment, the various methods further include bidding for impressions in the advertising campaign based on the response function.

This summary is provided to introduce a selection of concepts in a simplified form that are further described below in the Detailed Description of the Embodiments. This summary is not intended to identify key features or essential features of the claimed subject matter, nor is it intended to be used as an aid in determining the scope of the claimed subject matter.

BRIEF DESCRIPTION OF THE DRAWINGS

FIG. 5C depicts pseudo-code for the process flows of FIGS. 5A-5B.

DETAILED DESCRIPTION OF THE EMBODIMENTS

Figure 1:
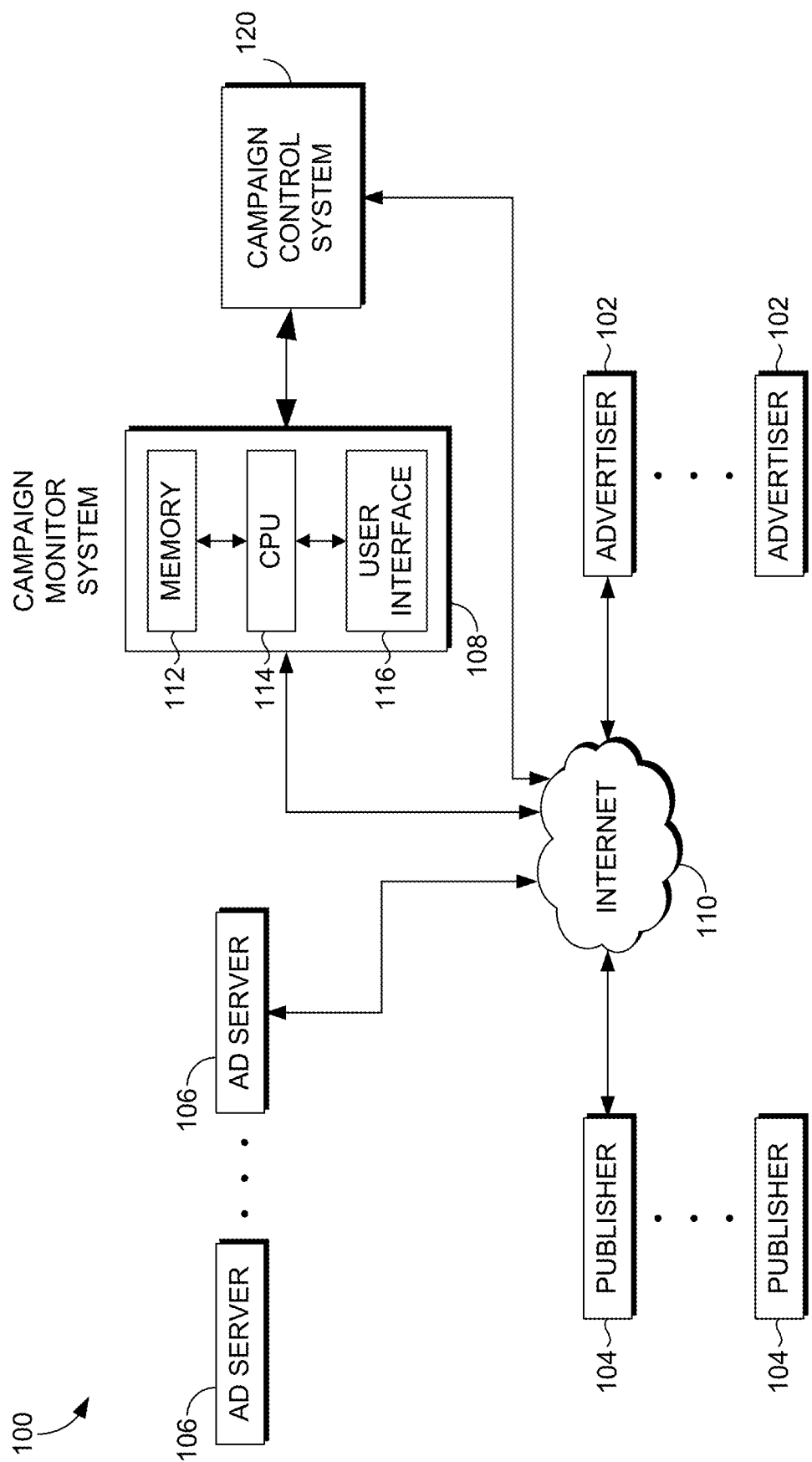
FIG. 1 depicts an illustrative advertising system, in accordance with embodiments of the present disclosure.

Internet "advertisers" and/or "marketers" (hereinafter used interchangeably to refer to a party that pays to provide content via a website or other forum provided via a computer communication network) often create "online campaigns" (or simply "campaigns") that include numerous content, such as advertisements designed to be placed on websites during a specified period of time. For example, a party, such as a marketer or advertiser, may design a "banner ad" or other such content associated with a product or service offered by the company. The party may wish to have the content placed on websites to promote the product or service. Each instance that content is placed on a website may hereinafter be referred to as an "impression." As used herein, and as discussed below, the terms "online market," "marketplace," "market," "advertising networks," or "marketing networks" are used interchangeably to refer to an environment, ecosystem, or platform where advertisers or marketers provide impressions to users.

Furthermore, an advertiser may have a spending plan that specifies how the advertiser wishes to spend a budget that has been allocated for the campaign. For instance, the advertiser may wish to spend money only on certain days, or certain times of day, during the campaign, or may wish to spend evenly over the duration of the campaign flight. Each advertiser may have a daily budget (e.g., $1,000 per day) and/or a daily goal of impression volume (e.g., one million impressions per day), known as "desired daily delivery" or "desired daily pacing." Each advertiser may also desire an ad campaign to perform certain types of consumer targeting (e.g., based on a demographic analysis) and/or achieve a particular distribution of advertisements across various websites ("spreading").

As used herein the terms "segment," "cell," and "unit" are used interchangeably to refer to a defined portion of an online market within which an online campaign is conducted or carried out. Such a segment or cell may be, for example, a website, a group of individuals identified by demographic analysis (e.g., males between the age of 25 and 35 in California), a distinct individual, etc. Thus, provided impressions may be targeted to one or more segments, cells, or units of the online market.

In certain advertising networks, ad servers receive impression requests from publishers (e.g., websites or other entities with an inventory of online ad space). The ad servers may group ad requests from various advertising campaigns, e.g., according to impressions to be "targeted" based on a combination of attributes defined by the ad requests.

In addition to targeting attributes, each ad request received from an advertiser generally includes a "bid price." At least a portion of the ad requests also include a "bid allocation" ("allocation.") The bid price is the amount of money that an advertiser (or party controlling the advertising campaign) offers in association with the ad request for placement of the targeted impression. The bid allocation, if present, is the percentage or ratio (e.g., point value from 0 to 1) of targeted inventory the controlling party of the advertising campaign is willing to purchase at the bid price. The list of ads that target a certain impression request may be sorted in descending order according to their bid price, and then placed in groups such that the sum of their bid allocations equals 1. If the ad request with the highest bid price has a bid allocation of 1, or if there is no restriction on bid allocation, it will win the impression. Such ad delivery methods ensure that the highest bidding advertiser is able to purchase as much inventory as desired. These methods also reveal both the marginal price of the impression inventory (e.g., the cost required per impression), and the amount of volume (e.g., the number or amount of impressions) purchased at each price.

At least a subset of purchased and/or provided impressions may be and/or become associated with one or more "events." More specifically, a particular impression may be and/or become associated with an event or "event type" (the type of event associated with a particular impression) when the particular impression meets one or more event requirements or criteria. Furthermore, such events may be associated with the particular impression, such that the association is bi-directional, i.e. the impression is associated with the event and the event is associated with the impression. Such event requirements or criteria may include, but are not limited to various user interactions with the impression. For instance, a user may select a particular impression, via a "click" event. When the user clicks the particular impression, the particular impression becomes associated with the click event.

Another event type includes an "action" event. For example, when a user takes a particular "action," such as but not limited to completing an online form to request additional information with regard to the product or service associated with a particular impression, the particular impression becomes associated with the action event. Another example includes when the user purchases the product or service associated with a particular impression, the particular impression becomes associated with an action event. The term "conversion" event may be used interchangeably with an action event.

Other event requirements or criteria may be based on properties or characteristics of the provided impression. For instance, an impression may be associated with a "viewability," or "viewable" event if the impression is viewable and/or actually viewed by a user. Such impressions may be "viewable" impressions. In at least one embodiment, a subset of impressions are also events, such as but not limited to a viewable impression, a clicked impression, a converted impression, or the like.

As used herein, the terms "price" and "cost" may be used interchangeably to refer to the winning bid price of an awarded impression and/or the bid price for an impression associated with an event. Accordingly, the discussions of the various embodiments may refer to event cost/price and/or impression cost/price.

The term "value" of a particular impression may refer to the likelihood or probability that the particular impression will become, or otherwise is associated with an event of an event type of interest. That is to say, the value of a particular impression refers to the expected value of the particular impression based on its likelihood to turn into a value-bearing event. If all value-bearing events have the same value, then "event value" may be used interchangeably with "event rate."

Accordingly, "event rate," or simply "rate" may refer to the ratio of the number of events in a group of events to the number of impressions in the associated group of impressions. For instance, in one embodiment where viewable events are of interest, 100 impressions are provided to 100 separate users. Furthermore, 73 of the 100 provided impressions are determined to be viewable events, and the viewable event rate is determined or estimated as 0.73. Briefly, the viewable event rate is estimated as 0.73 because the average likelihood or probability for each of the 100 impressions to be an in-view event is 0.73. Thus, an event rate-estimate may be determined as a moving average of the ratio of the number of the impressions that are, or become, an event of interest to the total number of impressions provided in a time-interval. In at least one embodiment as discussed below, the event rate-estimate may be based on a sampled number of impressions and a sampled number of events of interest.

Various event rate types may be defined, such as but not limited to viewable rates, in-target rates, click-through rates, conversion rates, completed video event rates, and the like. In some embodiments, the term event rate may refer to an overall event rate. In other embodiments, the term event rate may refer to a generalized event rate. In still other embodiments, the term event rate may refer to an event rate type. As used throughout, event rates may be referred to simply as rates.

Various ratios of the cost/price and event rate/values are discussed throughout. For instance, the term "effective cost per event" for a particular event type may refer to the ratio of the total cost (paid for a group of impressions) to the total number of events (the particular event type) associated with the group of impressions. Similarly, the term "effective cost per impression" refers to the ratio of the total cost to the total number of impressions.

As used throughout, "eCPM" stands for the effective cost per one thousand provided impressions. "eCPC" stands for the effective cost per click event, "eCPA" stands for the effective cost per action or conversion event. In various embodiments, "eCPV" stands for the effective cost per thousand viewable impressions. More generally, "eCPX" stands for effective cost of "X," where X may refer to any event type, including but not limited to any of "M," "C," "A," or "V" as used above. It should be understood that in the various embodiments, the event type that "X" represents is not so limited, and the effective cost per a particular event type may be used for any event (or impression) type with adequately defined event (or impression) requirements or criteria. In various embodiments, eCPX or an estimate for eCPX may be referred to as an "observed cost," "observed cost measurement," or "cost estimate." In some embodiments, eCPX may be simply referenced as $(\hat{c})$. As used herein, when referring to the concept of an effective cost per event, where the event type is left unspecified, the term "effective cost per event of interest" may be used, where the event of interest may be of any event type that is currently of interest to a user, such as but not limited to an advertiser. Furthermore, effective cost per event of interest may be used interchangeably with eCPX.

Advertisers are often interested in events and/or impressions, as well as associated event rates and/or values. For instance, when trying to increase awareness of a product or service, an advertiser may be interested in viewable events, as well as the viewable event rate. Likewise, when trying to provide more information about a product or service, advertisers are interested in click events and the associated click event rates. When trying to make sales of a product or service, advertisers are interested in conversion events and/or impressions, as well as the associated rates.

As discussed above in the context of bidding within a campaign, advertisers may pay based on impressions. For instance, an advertiser may pay for each provided impression. In at least one embodiment, over the course of the campaign, advertisers may pay based on whether the impressions are associated with events, such as click events, conversion events, or viewable impressions. Accordingly, effectively managing an online advertising campaign is of critical importance to an advertiser. Managing an online advertising campaign may include implementing a bidding strategy, and allocating bids (in the marketplace) based on the bidding strategy.

For instance, a bidding strategy may include bidding the same price for all impressions or the bid price is proportional to the event rate. A bidding strategy may include implementing constraints, such as but not limited to upper (and/or lower) thresholds on bid price, event rate, and/or other constraints. Other bidding strategies include bidding on impressions in such a way to maximize and/or minimize various event rates, event costs, and the like. Various bidding strategies include bidding on impressions in such a way to maximize, minimize, or otherwise optimize eCPX, while conforming to one or more bidding constraints, such as a daily budget, maximum impression cost, or the like.

Various embodiments for implementing such bidding strategies via various feedback loop control systems are discussed in U.S. patent application Ser. No. 13/416,796, filed on Mar. 9, 2012, entitled SYSTEMS AND METHODS FOR CONTROLLING ONLINE ADVERTISING CAMPAIGNS, the entirety of the contents of which is incorporated herein by reference. As used throughout, U.S. patent application Ser. No. 13/416,796 is referred to as the '796 application.

A cumulative impression and/or event distribution encodes actionable information that may be employed in the optimization, control, forecasting, and other tasks associated with managing an online campaign. The cumulative distribution may be a function of the price (or cost) and the value (or rates) of impressions or events. For instance, various embodiments of the '796 application employ one or more control signals to control an advertising campaign in such a way to achieve various bidding strategies. Values for the one or more control signals may be determined and/or generated via one or more response curves generated from such a bivariate cumulative distribution.

The various embodiments included herein are directed to the generation of multivariate functions, based on impression/event data observed in an advertising campaign, as well as the generation of associated response functions. The various embodiments discussed herein provide methods for the generation of such multivariate functions, such that the functions are computationally efficient to query and employ, especially in light of the large amount of data required to generate such multivariate functions and associated response functions.

Although various embodiments discussed herein are directed to bivariate cumulative distribution functions (dependent on price/cost and value/rate independent variables), it should be understood that other embodiments include higher dimensionality of independent variables. For instance, various embodiments may be employed for functions of N dimensions, where N is an integer that is greater than or equal to 2. The various embodiments discussed herein include generating a multivariate discrete function based on a plurality of transactions, i.e. a cumulative distribution of the transactions. The transactions may include virtually any transactions, including but not limited to impressions or associated events included in an online campaign. The discrete function is smoothed to generate a continuous function, where, in some embodiments, it is assumed that the basis functions of the independent variables of the continuous function are separable. Thus, the continuous function may be represented as a linear sum of basis functions in each of the dimensions. In other embodiments, the basis functions may not be separable in the dimensions of the independent variables. The response function may be determined as a linear sum of the partial derivatives of the continuous function (as determined via the expansion of the basis functions). It should be noted that, in various embodiments, the response function is a continuous function, i.e. the response function is continuous in at least one independent variable.

In order to increase the efficiencies when querying the discrete function, various embodiments of recursive binning processes are employed to generate the discrete function. Such recursive binning embodiments employ the variance of the distribution across candidate bins. As used herein, the term "bin" may refer to an interval in the domain of a function. If the function is an N dimensional function, (i.e. the function is a function of N independent variables) where N is an integer greater than or equal to 2, the bin is an N dimensional bin. Thus, the dimensionality of the bin may be equivalent to the dimensionality of the domain of the function. In various embodiments, the binning of a discrete function may be non-uniform, i.e. the size of the intervals is not uniform. In other embodiments, the bins may be uniform bins.

When the variance of the distribution across the candidate bin exceeds a threshold value, the candidate bin is further segmented into additional bins (each of which may be further recursively segmented based on the variance across additional bins). Thus, the segmentation may continue until the variance across the segmented bin is less than a threshold value, or the bin reaches a minimum size in at least one of binned dimensions. The binning process converges when each of the candidate bins satisfies one or more binning termination criteria. Accordingly, the discrete function is more finely binned (or segmented) across regions that include larger variances (or gradients) and more coarsely binned in more uniform regions of the discrete function.

Various embodiments of binning a discrete function more finely across highly varying regions and more coarser across more uniform regions may significantly decrease the number of queries required to interrogate and/or evaluate the discrete function, i.e. the discrete function is adequately determined with significantly less bins. For instance, if a two-dimensional discrete function is uniformly binned (M segments in the first dimension and N segments in the second dimension), then MN bins would be required. In the various embodiments presented herein, significantly less than MN bins may be required to generate the discrete function, based on at least approximations or estimations of the variation, gradient, slope, or derivative of the function. Furthermore, because the discrete function is more finely binned across the regions of large variance, decreasing the total number of bins does not significantly decrease the fidelity of the model that the discrete function provides for the underlying data, i.e. the fine structure of the cumulative distribution of events as a function of price and event rate. Rather, the decrease in the number of bins mostly comes from regions of low variance, and thus coarse structure.

In addition to increasing the efficiency of querying the discrete function, the reduction in the number of bins results in increased efficiencies when storing and manipulating the discrete function. For instance, less bins result in less data to store and transmit when manipulating the discrete function. In at least one embodiment, the discrete function may be encoded in a look-up-table (LUT), where the size of the LUT is reduced due to the reduction in the number of bins. Furthermore, because the continuous and response functions are represented as linear summations of basis functions across the bins, the resulting continuous and response functions are computationally more efficient to query, manipulate, store, transmit, and the like.

It should also be noted that although the various embodiments discussed herein are applicable to cumulative distributions of campaign transactions in two dimensions, the embodiments are not so constrained. That is to say, the various processes discussed herein for binning and generating discrete functions, as well as the generation of continuous functions and response functions may be generalized to higher dimensions and be employed for data that indicates events other than advertising campaign transactions. Reference will now be made in detail to illustrative embodiments of the invention, examples of which are illustrated in the accompanying drawings.

Exemplary Advertising System and Environment

FIG. 1 depicts an illustrative advertising system 100, in accordance with embodiments of the present disclosure. As shown in FIG. 1, advertising system 100 may include one or more advertisers 102, publishers 104, ad servers 106, one or more campaign monitor systems 108, and one or more campaign control systems 120, that are in communication with one another through a network, such as the Internet 110. The number and orientation of the computing components in FIG. 1 is provided for purposes of illustration only. Any other number and orientation of components is possible. For example, one or more of advertisers 102, publishers 104, ad servers 106, campaign monitor systems 108, and campaign control systems 120 may be combined or co-located and/or communicate directly with one another, instead of over Internet 110. The components of FIG. 1 may include any type or configuration of computers and/or servers, such as, for example, a server cluster, a server farm, load balancing servers, distributed servers, etc. In addition, each component may include one or more processors, memories or other data storage devices (i.e., computer-readable storage media), such as hard drives, NOR or NAND flash memory devices, or Read Only Memory (ROM) devices, etc., communications devices, and/or other types of computing elements.

Advertisers 102 represent computing components associated with entities having online advertisements (e.g., banner ads, pop-ups, etc.) that the entities desire to deliver to online consumers. Advertisers 102 may interact with publishers 104, ad servers 106, campaign monitor systems 108, and/or campaign control system 120 through the Internet 110. Thus, advertisers 102 may be able to communicate advertising information, such as ad information, targeting information, consumer information, budget information, bidding information, etc., to other entities in system 100.

Publishers 104 represent computing components associated with entities having inventories of available online advertising space. For example, publishers 104 may include computing components associated with online content providers, search engines, e-mail programs, web-based applications, or any computing component or program having online user traffic. Publishers 104 may interact with advertisers 102, ad servers 106, campaign monitor system 108, and/or campaign control systems 120 via the Internet 110. Thus, publishers 104 may be able to communicate inventory information, such as site information, demographic information, cost information, etc., to other computing components in system 100.

Ad servers 106 may include servers or clusters of servers configured to process advertising information from advertisers 102 and/or inventory information from publishers 104, either directly or indirectly. In certain embodiments, ad servers 106 may be remote web servers that receive advertising information from advertisers 102 and serve ads to be placed by publishers 104. Ad servers 106 may be configured to serve ads across various domains of publishers 104, for example, based on advertising information provided by advertisers 102. Ad servers 106 may also be configured to serve ads based on contextual targeting of web sites, search results, and/or user profile information. In some embodiments, ad servers 106 may be configured to serve ads based on control signals generated by campaign control system 120.

Figure 2A:
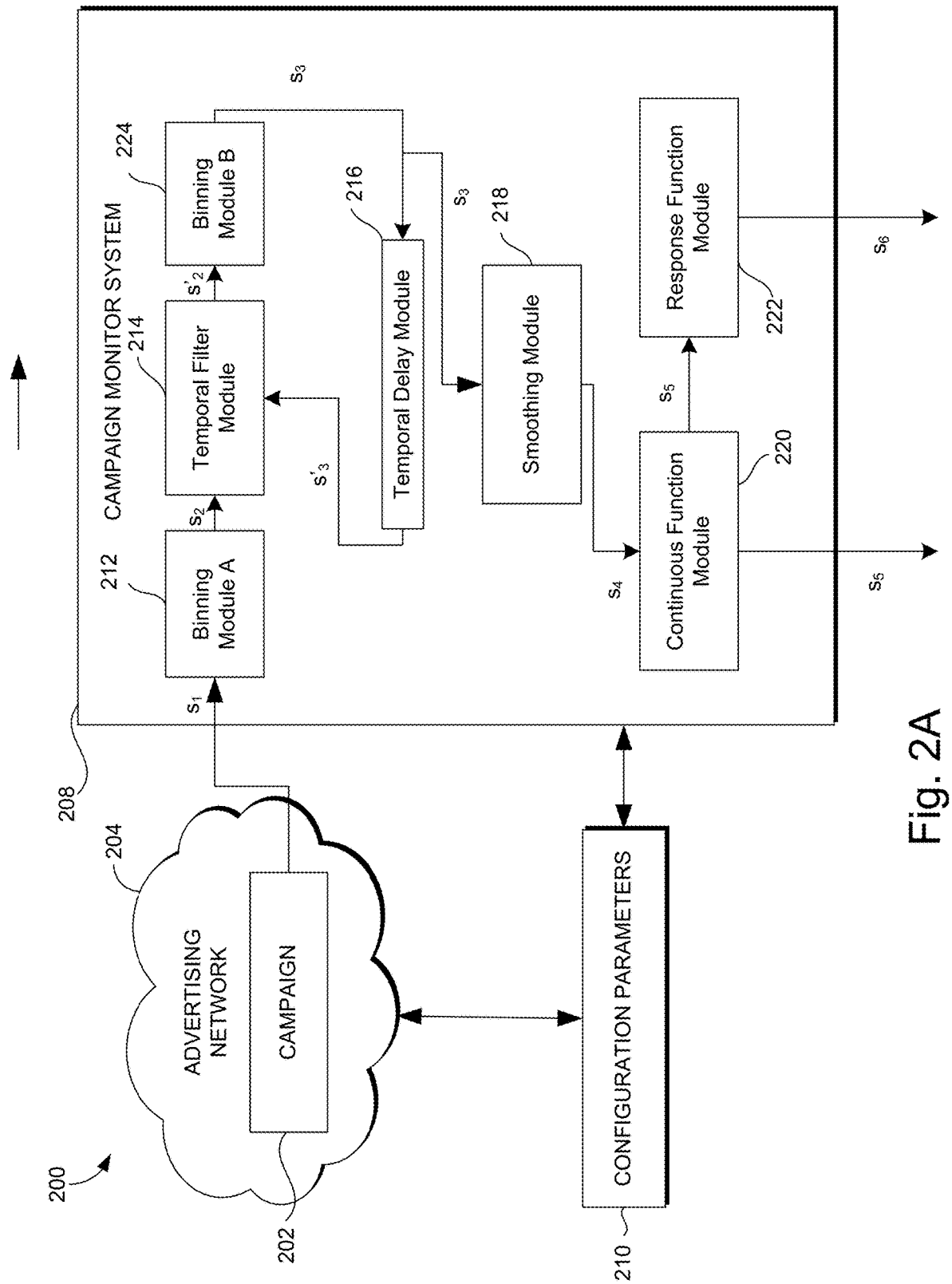
FIG. 2A depicts an illustrative campaign monitor system for monitoring and controlling an online advertising campaign operating in an online advertiser network.
Figure 3:
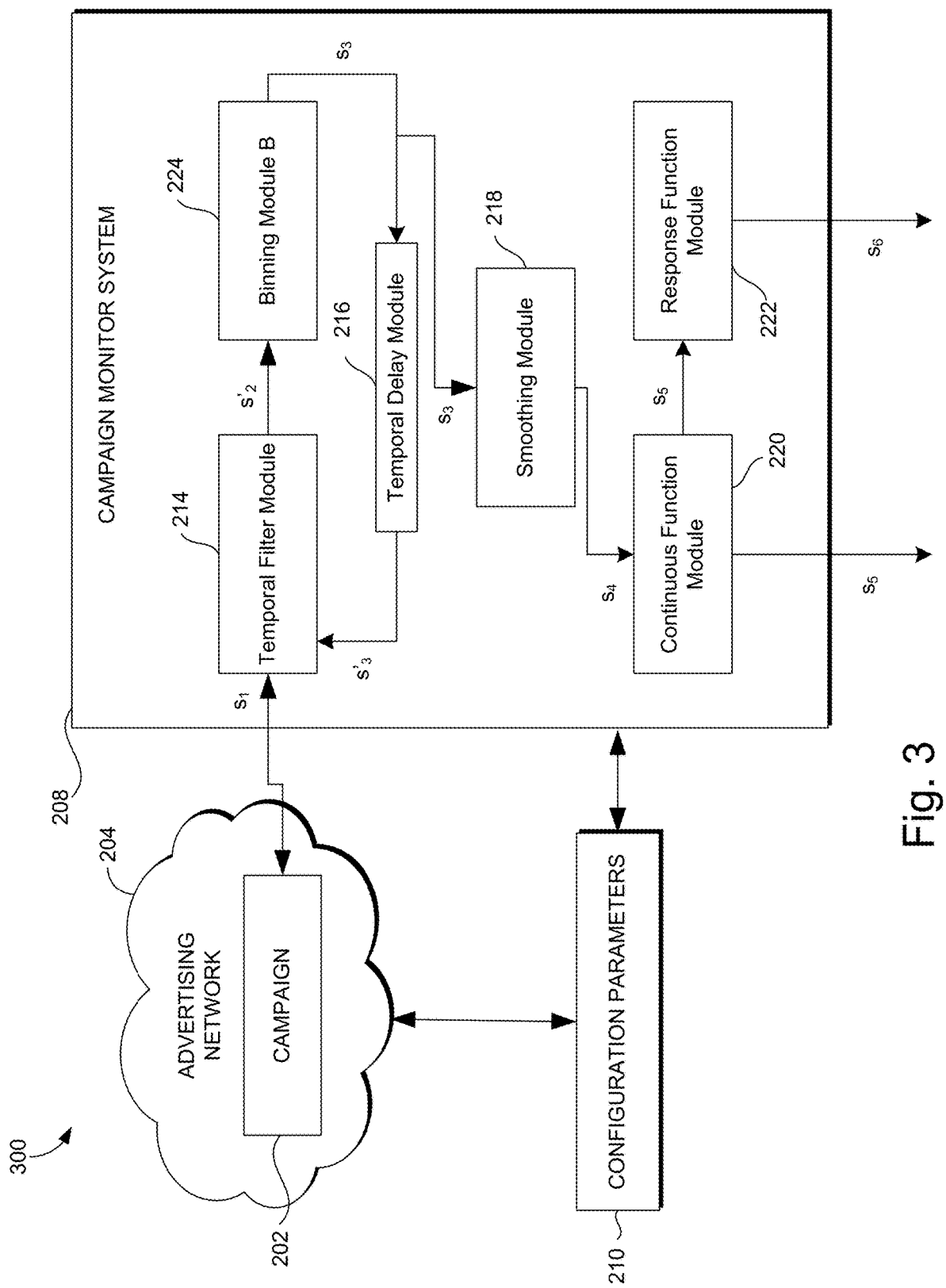
FIG. 3 depicts an alternative embodiment of a campaign monitor system for monitoring and controlling an online advertising or marketing campaign operating in an online advertiser or marketing network.

Various embodiments of campaign monitor systems, such as but not limited to campaign monitor system 108, are discussed in conjunction with at least campaign monitor system 208 of FIGS. 2A and 3. Campaign monitor system 108 may include computing systems configured to receive information from computing components in system 100, process the information, and generate various functions, such as the various multivariate discrete and continuous functions, as well as the various response curves, discussed herein. Furthermore, campaign monitor system 108 may provide one or more signals, functions, and/or response curves to campaign control system 120.

Campaign monitor system 108 may include any type or combination of computing systems, such as clustered computing machines and/or servers, including virtual computing machines and/or virtual servers. Campaign monitor system 108 may include, for example, implementations of at least portions of Adlearn Open Platforms (AOP) control systems offered by America Online (AOL) of New York, N.Y. In some embodiments, campaign monitor system 108 may include an assembly of hardware, including a memory 112, a central processing unit ("CPU") 114, and/or a user interface 116. Memory 112 may include non-transitory memory. In at least one embodiment, memory 112 includes transitory memory. Memory 112 may include any type of RAM or ROM embodied in a physical, computer-readable storage medium, such as magnetic storage including floppy disk, hard disk, or magnetic tape; semiconductor storage such as solid state disk (SSD) or flash memory; optical disc storage; or magneto-optical disc storage. CPU 114 may include one or more processors for processing data according to instructions stored in the memory, for example to perform the methods and processes discussed in detail herein. The functions of the processor may be provided by a single dedicated processor or by a plurality of processors. Moreover, the processor may include, without limitation, digital signal processor (DSP) hardware, or any other hardware capable of executing software. User interface 116 may include any type or combination of input/output devices, such as a display monitor, graphical user interface, touch-screen or pad, keyboard, and/or mouse. In other embodiments, campaign monitor system 108 may include virtual representations of hardware operating, for example, on a virtual server.

Various embodiments of campaign control systems, such as but not limited to campaign control system 120 are described in the '796 application. However, briefly campaign control systems 120 may include computing systems configured to receive information from computing components in system 100, process the information, and generate advertising control signals to be sent to other computing components in system 100, according to the illustrative methods described herein. Campaign control system 120 may include any type or combination of computing systems, such as clustered computing machines and/or servers, including virtual computing machines and/or virtual servers. Campaign control system 120 may include, for example, implementations of Adlearn Open Platforms (AOP) control systems offered by America Online (AOL) of New York, N.Y. Campaign control system 120 may be enabled to receive one or more signals, functions, and/or response curves from campaign monitor system 108. In at least one embodiment, at least portions of campaign monitor system 108 may be included in campaign control system 120. In some embodiments, at least portions of campaign control system 120 may be included in campaign monitor system 108.

FIG. 2A depicts and illustrative campaign monitor system 208 for monitoring and controlling an online advertising campaign 202 operating in an online advertiser marketing network 204. Advertising network 204 may include a network or collection of one or more advertisers 102, one or more publishers 104, ad servers 106, campaign control systems 120, or other components of system 100 of FIG. 1. Elements of advertising network 204 may operate to receive impression requests associated with one or more advertising inventories, e.g., from publishers 104 such as websites or other computing components with an inventory of online marketing space. Advertising network 204 may also group impression requests for various advertising campaigns, e.g., according to impressions to be "targeted" based on a combination of attributes defined by the marketing requests. Advertising network 204 may also accept bids (e.g., from one or more campaign control systems, such as but not limited to campaign control system 120 of FIG. 1) on the impression requests and process the bids to serve ads to the impression requests.

Any number or type of advertising campaigns 202 may be operated within advertising network 204, across various ad servers and domains associated with the Internet. Online advertising environment 200 may be implemented by one or more of the advertisers 102, publishers 104, ad servers 106, campaign monitor system 208, and/or campaign control system 120 described in FIG. 1. For example, online advertiser environment 200 may represent the interaction of one or more campaign control systems 120 with other computing components in system 100.

Although not shown in FIG. 2A, online advertising environment may include one or more instances of a campaign control system, such as but not limited to control system 120 of FIG. 1, or any of the various embodiments of campaign control system discussed in conjunction with the '796 application. A campaign control system may employ a response function generated by a campaign monitor system, such as but not limited to campaign monitor system 108 of FIG. 1 or campaign monitor system 208 of FIGS. 2A and 3, to control an advertising campaign.

In one embodiment, online advertising environment 200 may include one or more instances of campaign monitor system 208. Campaign monitor system 208 may include, or be similar to at least one of campaign monitor systems 108. Campaign monitor system 208 may comprise computers or servers connected to the Internet. Such computers or servers may be configured as described with respect to campaign monitor system 108, as depicted by FIG. 1, or in any other suitable configuration. Furthermore, such computers or servers may include similar features to computing device 700 of FIG. 7. Alternatively, campaign monitor system 208 may be implemented by software modules executed by CPUs 114 of campaign monitor system 108. Campaign monitor system 208 may be embodied entirely in hardware, entirely in software, or in any combination of hardware and software implemented across any number of computing devices.

Figure 2B:
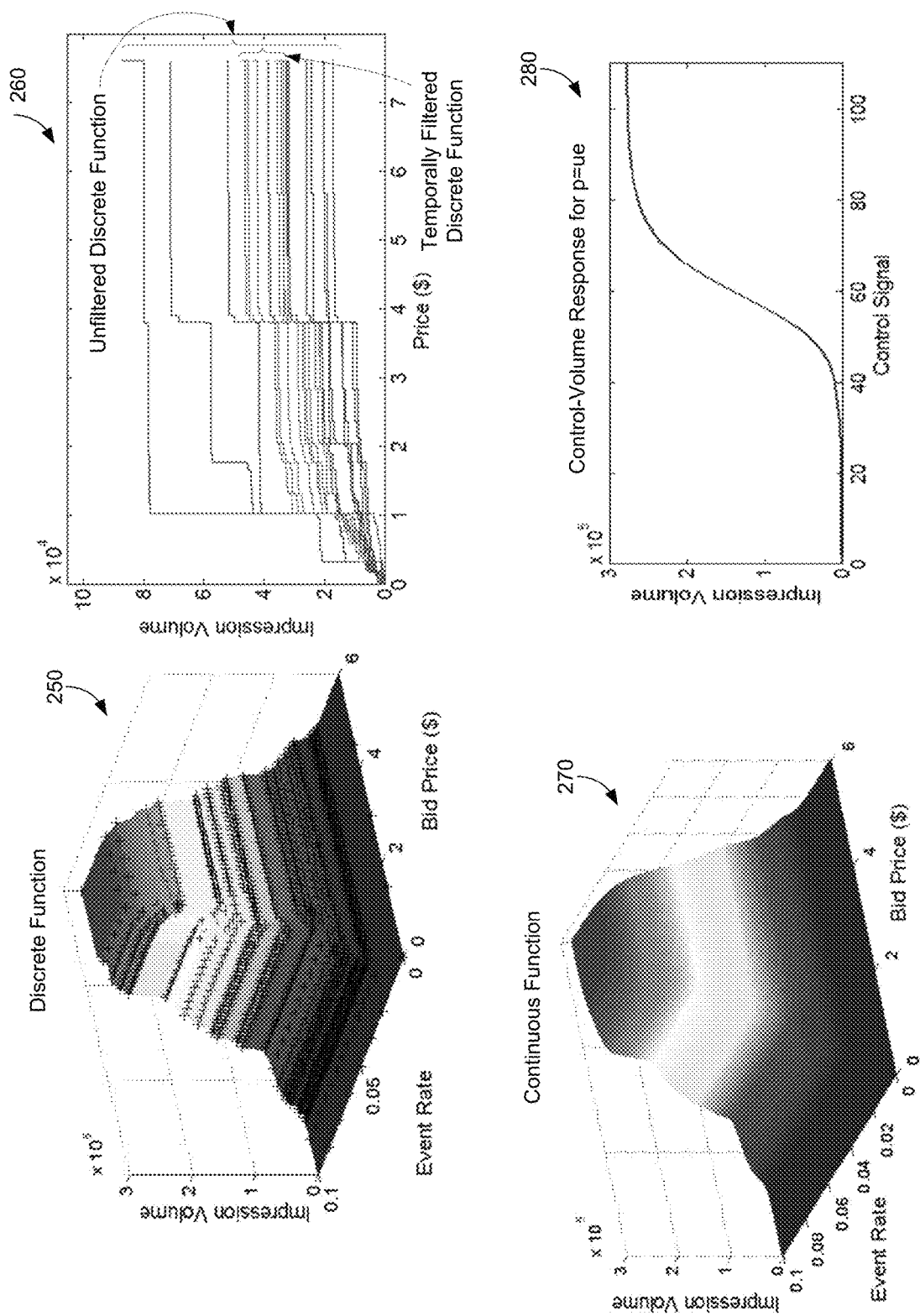
FIG. 2B illustrates various functions generated and/or updated by an exemplary embodiment of a campaign monitor system.
Figure 4A:
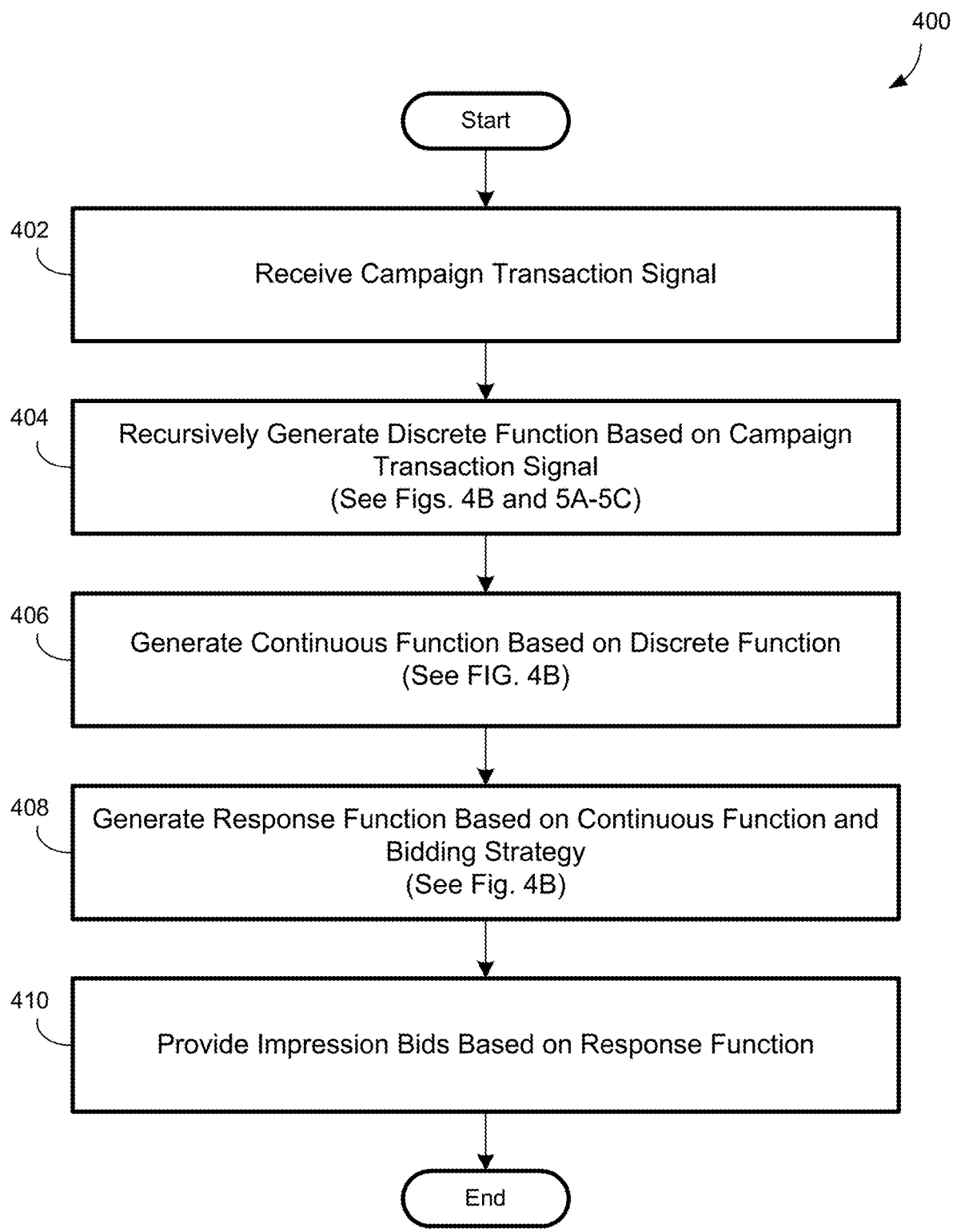
FIG. 4A depicts an illustrative process flow for monitoring and controlling an online advertising campaign, in accordance with various embodiments of the present disclosure.
Figure 4B:
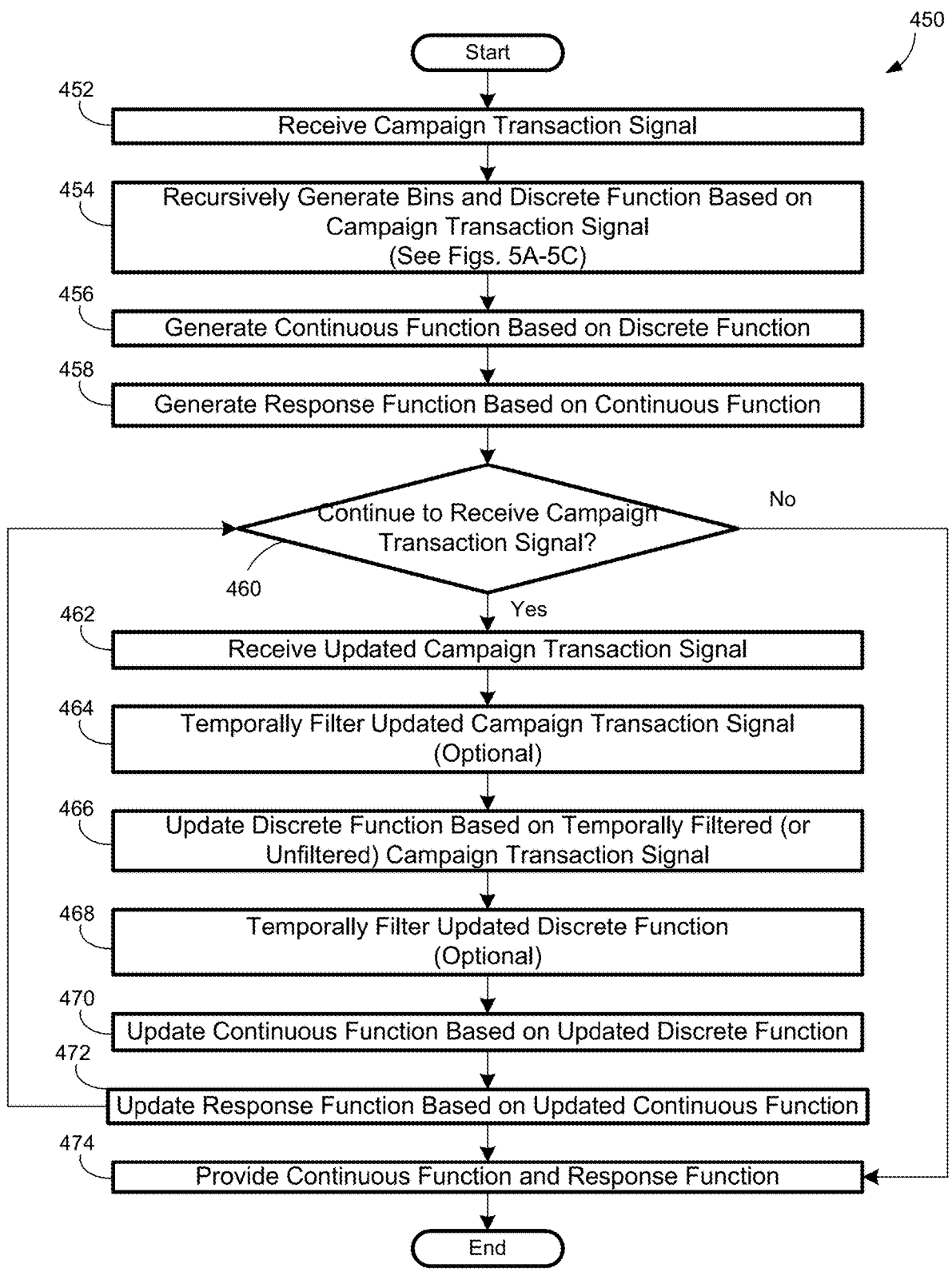
FIG. 4B depicts an illustrative process flow for generating a response function of an online advertising campaign, in accordance with various embodiments of the present disclosure.
Figure 5A:
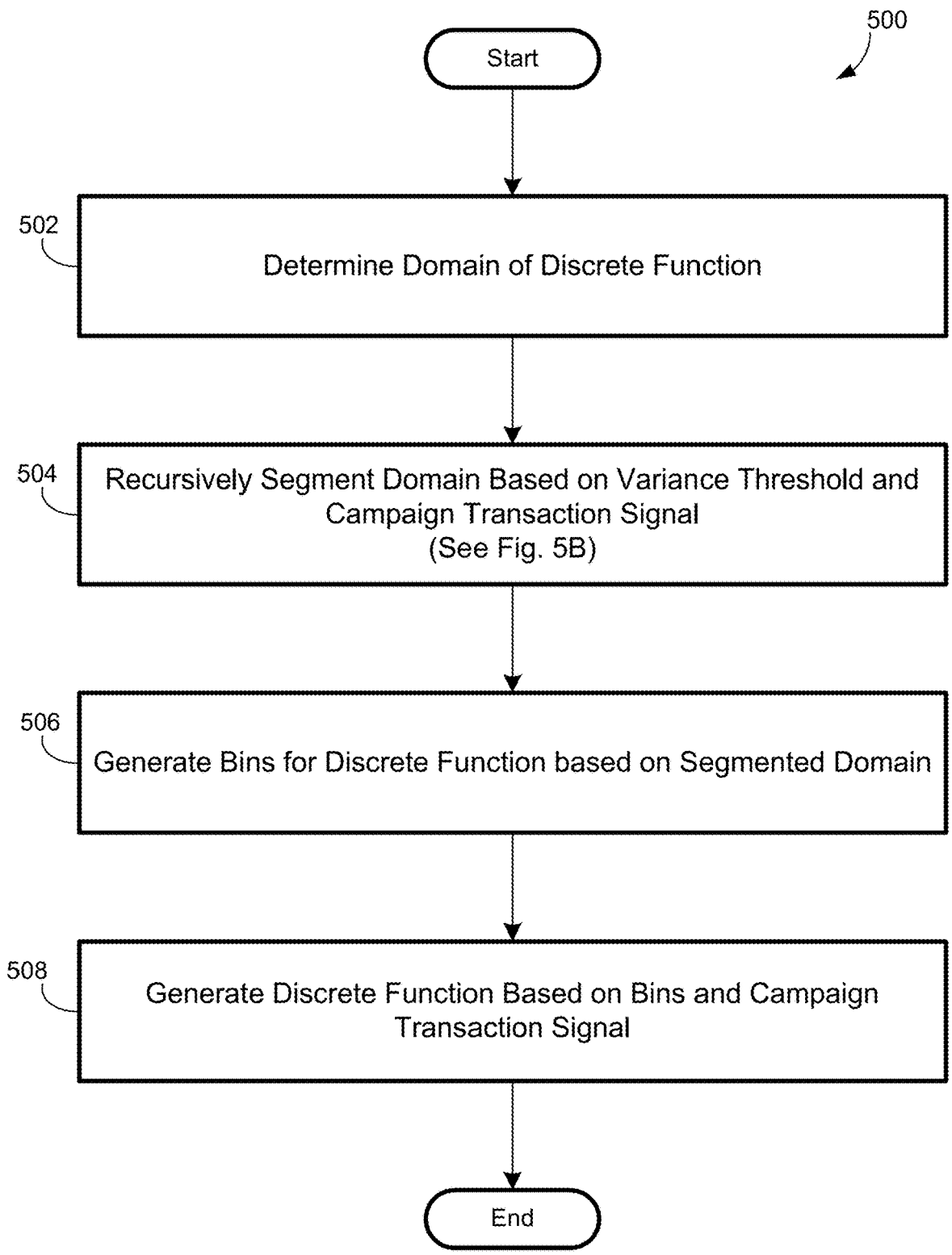
FIG. 5A depicts an illustrative process flow for generating a discrete function of an online advertising campaign, in accordance with various embodiments of the present disclosure.

Various embodiments of campaign monitor system 208 may be enabled to perform, execute, and/or implement at least portions of any of processes 400, 450, 500, and 550 discussed in conjunction with FIGS. 4A, 4B, 5A, and 5B respectively, as well as pseudo code 570 of FIG. 5C. FIG. 2B illustrates various functions generated and/or updated by campaign monitor system 208.

As shown in FIG. 2A, campaign monitor system 208 is enabled to receive a campaign transaction signal ($s_1$) and provide a continuous function, via signal $s_5$, as well as a response function, via signal $s_6$. Campaign monitor system 208 will be discussed in conjunction with at least FIG. 2B. In the various embodiments, campaign monitor system 208 generates and/or updates the continuous function and the response function based on the campaign transaction signal $s_1$. The response function may be employed by one or more campaign control systems, such as but not limited to campaign control system 120 and/or any of the various embodiments discussed in conjunction with the '796 application to control an advertising campaign, via one or more control signals based on the response function.

As shown in FIG. 2A, campaign monitor system 208 may include one or more binning modules (or alternatively one or more binning engines), one or more temporal filters (or alternatively temporal filtering engines), one or more temporal delay modules, one or more smoothing modules (or alternatively smoothing engines), one or more continuous function modules (or continuous function engines, and/or one or more response function modules (or alternatively response function engines. More particularly, in some embodiments, campaign monitor system 208 may include a first binning module (binning module A 212), temporal filter module 214 (or alternatively a filtering engine), a second binning module (binning module B 224), temporal delay module 216, smoothing module 218, continuous function module 220, and response function module 222, arranged as shown in FIG. 2A Other embodiments of campaign monitor system 208 may include more or less components, modules, engines, or the like. Campaign monitor system 208 may be provided with a set of one or more configuration parameters 210, which may be adjustable, provided by, and/or set by a user. Various configuration parameters will be discussed throughout, each of which may be included in configuration parameters 210.

Advertising network 204 provides campaign transaction signal $s_1$ to the campaign monitor system 208. The campaign transaction signal $s_1$ may encode and/or indicate at least one of a price or an event rate for each of a plurality of transactions in the advertising campaign. The transactions may include impressions that were awarded based on previous bids, as well as any associated events. Thus, $s_1$ may encode and/or indicate a plurality of previously awarded impressions, as well as the price (or cost) paid for and the event rate associated with each previous awarded impressions.

In at least one embodiment, campaign transaction signal $s_1$ may be received by binning module A 212. Binning module A 212 generates and/or updates a discrete function based on the campaign transaction signal $s_1$. The generated/updated discrete function may be a multivariate function that indicates and/or provides a distribution of the plurality of transactions that are indicated by the campaign transaction signal $s_1$. In some embodiments, the multivariate discrete function is a cumulative distribution in two or more dimensions. Although other embodiments are not so constrained, the multivariate discrete function may be indicative of any metric or other quantitative value (scalar or vector).

In one exemplary, but non-limiting embodiment, the discrete function indicates and/or provides a discrete cumulative distribution of the plurality of transactions, wherein the dimensionality of the distribution includes a price dimension and an event rate dimension. The price dimension corresponds to the price of each of the plurality of transactions. The event rate dimension corresponds to the event rate of the plurality of transactions. Accordingly, the discrete function may be a cumulative bivariate distribution, wherein the two dimensions correspond to the price of impressions (or events) and the event rate associated with the impressions. In such embodiments, the discrete function is a function of two independent variables: price and event rate. In other embodiments, the discrete function may be of higher dimensionality, where other variables associated with the transactions are accounted for. Although the various embodiments discussed herein are directed towards generating and/or updating various discrete, continuous, and response function relating to campaign transactions, it should be understood that other embodiments are not so constrained. It should be understood that the various embodiments may be extended to generate/update functions of unlimited dimensionality that indicate other values unrelated to campaign transactions.

After an initial generation of the discrete function, based on the campaign transaction signal sampled at a first temporal (or time) sample time, binning module A 212 may update the discrete function at subsequent temporal sample times. In the various embodiments, the bivariate discrete function, at the kth temporal sample, is notated as $y_k(p,e)$, where p (price) and e (event rate) are the independent variables. Thus, $y_k(p,e)$ may refer to the cumulative distribution of impression volumes at the kth temporal sample, where the prices and event rates for the impressions are less than or equal to p and e respectively. Thus, for the first time sample (k=0), binning module A 212 may generate the discrete function $y_0(p,e)$. For a subsequent time sample (k), binning module A 212 may update the discrete function $y_k(p,e)$ based on at least one of $y_{k-1}(p,e)$, $y_{k-2}(p,e)$, ..., $y_0(p,e)$, or a combination thereof.

Binning module A 212 recursively segments the domain of the discrete function into a plurality of bins. The dimensionality of the bins matches the dimensionality of the domain of the discrete function. Thus, in one exemplary embodiment, the bins are two-dimensional (2D) bins corresponding to the price and event rate dimensions of the domain of the discrete function. The domain is bounded by applicable ranges for each of the independent variables and/or dimensions, which may be defined and/or indicated by a subset of configuration parameters 210. Thus, in one exemplary embodiment, the price dimension and the rate dimension are segmented into a plurality of bins. The bins may be recursively determined and/or generated based on one or more threshold values, which may be defined and/or indicated by another subset of configuration parameters 210. As discussed in conjunction with at least FIGS. 5A-5C, the one or more threshold values may be employed to recursively segment each dimension and/or independent variable of the domain based on the variance of the discrete function across the recursively determined/generated domains. Plot 250 of FIG. 2B shows a plot of the bivariate discrete function $y_k(p,e)$, where the "+" ticks are positioned approximately in the center of each of the 2D bins in the price and event rate dimensions. Thus, the bivariate discrete function shown in plot 250 may be generated/updated by binning module A 212 based on the campaign transaction signal $s_1$ and configuration parameters 210.

As shown in the embodiment of FIG. 2A, the discrete function may be provided to temporal filter module 214. For instance, the discrete function may be encoded and/or indicated by signal $s_2$, which is transmitted from binning module A 212 to temporal filter module 214. The initial binning of the campaign transaction signal via binning module A 212 may reduce the computational and memory costs required by temporal filter module 214 at the kth temporal sample.

Temporal filter module 214 may apply a temporal filter to or otherwise time average the discrete function to generate and/or update a temporally filtered discrete function $\bar{y}_k(p,e)$. More specifically, a temporally filtered discrete function at a previous time sample (e.g. the (k−1)-th time sample) was previously provided to temporal delay module 216 via signal $s_3$. For instance, $\bar{y}_{k-1}(p,e)$ may be delayed or buffered via temporal delay module 216 for one or more time samples. After a delay of one or more time samples, temporal delay module 216 provides a feedback signal, $s'_3$, to temporal filter 214. Feedback signal $s'_3$ encodes and/or indicates $\bar{y}_{k-1}(p,e)$. Temporal filter module 214 may generate and/or update a temporally averaged discrete function $\bar{y}_k(p,e)$ based on a combination of $\bar{y}_{k-1}(p,e)$ and $y_k(p,e)$. In at least one embodiment, $\bar{y}_k(p,e)$ is updated, via the below equation:

$$\bar{y}_k(p,e)=\xi \bar{y}_{k-1}(p,e)+(1-\xi)y_k(p,e).$$

$\xi$ is a forgetting factor (between 0.0 and 1.0) that may be included in configuration parameters 210. It should be understood that alternative temporal filters may be applied via temporal filter module 214. For instance, the above equation could include additional terms based on the discrete function at temporal samples previous to the (k−1)-th sample. Another configuration parameter of the temporal filter module 214 may include the number of samples that temporal delay module 216 holds of the discrete function. In some embodiments, binning module 212 may include at least components of temporal filter module 214 and/or temporal delay module 216. For instance, binning module may include one or more memory devices to store previous versions of the discrete function, and apply the temporal filter.

In various embodiments, such as that shown in FIG. 2A, the temporally filtered discrete function may be provided via signal $s'_2$ to another binning module, binning module B 224. Binning module B 224 may include similar features, functionalities, and the like as binning module A 212. For instance, binning module B 224 may implement similar methods, processes, workflows, and the like as binning module A 212. However, binning module B 224 bins the temporal filtered discrete function, via signal $s'_2$, rather than raw or unprocessed campaign transaction signal $s_1$. The second binning module, binning module 224 may reduce the computation and memory costs for the temporal filter module 214 at the next temporal sample (i.e. the (k+1)-th temporal sample). For instance, the combination of signals $s_2$ and $s'_3$ in temporal filter module 214 may result in an increase in the total number of discrete data points that need to be filtered and/or averaged as the total number of samples increases (as time increases). The second binning process, performed via binning module B 224 reduces the growth of the total number of discrete data points that the temporal filter module 214 is managing at the (k+1)-th temporal sample.

Binning module B 224 may also reduce the computation/memory costs for downstream modules, such as but not limited to smoothing module 218, the continuous function module 220, and the response function module 220, for the kth temporal sample. In at least one embodiments, binning module B 224 may be integrated and/or combined with temporal filter module 214.

Plot 260 of FIG. 2B shows the effect of temporally filtering the discrete function. Plot 260 shows event-rate slices of the unfiltered discrete function ($s_2$) at 10 successive temporal samples. The unfiltered discrete functions are bracketed by the larger (outer) bracket. Plot 260 additionally shows the corresponding event-rate slices of the temporally filtered discrete functions ($s'_2$) at the 10 successive temporal samples. The temporally filtered discrete functions are bracketed by the smaller (inner) bracket. A forgetting factor of =0.85 was used in the temporal filter associated with plot 260. As shown in plot 260, temporally filtering the discrete function has a significant effect on the variance of the discrete function between successive temporal samples, i.e. the temporal filter effectively filters out a significant amount of noise inherent in the campaign transaction signal ($s_1$). Accordingly, the temporal filter reduces the volatility of the continuous function and the response function, generated by the campaign monitor system 208. The volatility of the temporally filtered discrete functions may be reduced, increased, adjusted, or otherwise controlled via an adjustment to the forgetting factor.

In an alternative embodiment, shown in FIG. 3, the campaign transaction signal is temporally filtered by the temporal filter module 214 prior to the generation/update of the discrete function. Advertising environment 300 is similar to advertising environment of FIG. 2. However, campaign monitor system 208 in environment 300 includes only a single binning module, binning module B 224, which is downstream from temporal filter module 214. In an embodiment not shown in the figures, the only binning module employed is binning module A 212, upstream of temporal filter module 214, i.e. binning module B 224 is not included in campaign monitor system 208. In still another alternative embodiment (also not shown in the figures), the temporal filter may be applied downstream of the smoothing module 218. Smoothing module 218 is discussed below. In at least one embodiment, the temporal filter is not employed. In other embodiments, no temporal filter is applied.

The smoothing module 218 generates and/or updates a "smoothed" model of the temporally filtered (or unfiltered) discrete function. In various embodiments, one or more regression techniques, such as but not limited to multi-dimensional splines, are employed to "smooth" the discrete function and generate/update the smoothed model. Thus, smoothing module 218 may generate/update a smoothed model for the discrete function, such as but not limited to multi-dimensional spline model of the discrete function.

The smoothed model is provided to the continuous function module 220 via signal $s_4$. Continuous function module 220 generates and/or updates a continuous function based on the smoothed model. Thus, continuous function module 220 may generate and/or update the continuous function based on smoothed model, which is based on the temporally filtered (or unfiltered) discrete function. The continuous function may have the equivalent dimensionality and/or independent variables as the discrete function. The domain of the continuous function may be equivalent to the domain of the discrete function and based on configuration parameters 210. The continuous function provides a continuous model or estimation of the discrete function. Thus, in some embodiments, the continuous function provides a continuous cumulative distribution of the plurality of transactions in the price and event rate dimensions, i.e. the continuous function is continuous in the price dimension and the event rate dimensions. For such embodiments, the bivariate continuous function may be notated as $f_{\hat{\theta}}(p,e)$, where $\hat{\theta}$ refers to the smoothed model of the discrete function. In various embodiments, at least portions of $f_{\hat{\theta}}(p,e)$ and B are generated/updated by smoothing module 218, continuous function module 220, or a combination thereof. In at least one embodiment, $\hat{\theta}$ is determined, generated, and/or updated via the following optimization process:

$$\hat{\theta} = \operatorname{argmin}_{\theta \geq 0} \left\{ \sum_{i=1}^{N_p} \sum_{j=1}^{N_e} [\bar{y}_k(p_i, e_j) - f_\theta(p_i, e_j)]^2 = \eta(f_\theta) \right\}.$$

$$\sum_{i=1}^{N_p} \sum_{j=1}^{N_e} [\bar{y}_k(p_i, e_j) - f_\theta(p_i, e_j)]^2 + \eta(f_\theta)$$

is the cost function with a penalty function $\eta(f_\theta)$ associated with the optimization. The summation over the i index is over each bin (or domain segment) and along the price dimension (or axis) and the summation over the j index is over each bin and along the event rate dimension (or axis). That is to say, $N_p$ represents the number of segments of the domain (of the discrete function) in the price dimension. Similarly, $N_e$ represents the number of segments of the domain (of the discrete function) along the event rate dimension. Thus, the total number of bins is $N_p N_e$, which is based on the recursive binning process discussed in conjunction with FIGS. 5A-5C. B represents the model that minimizes the above expression. In one non-limiting embodiment, the penalty function takes the form:

$$\eta(f_\theta) = \lambda_p \sum_{j=1}^{N_e} \int_{P_{low}}^{P_{high}} \left[ \sum_{i=1}^{N_p} \theta_{ij} M_i''(p) \right]^2 dp + \lambda_e \sum_{i=1}^{N_p} \int_{e_{low}}^{e_{high}} \left[ \sum_{j=1}^{N_e} \theta_{ij} N_j''(e) \right]^2 de,$$

$\lambda_p$ is a smoothing parameter in the price dimension and $\lambda_e$ is a smoothing parameter in the event rate dimension. $\lambda_p$ and $\lambda_e$ may be included in configuration parameters 210. The price and event rate independent variables may be separable variables. Thus, the dependence of the continuous function of the price and event rate may be separable. $M_i(p)$ is the basis function (of the price independent variable) of the smoothed model of the discrete function across the ith segment (or bin) of the price dimension. Similarly, $N_j(e)$ is the basis function (of the event rate independent variable) of the smoothed model of the discrete function across the jth segment (or bin) of the event rate dimension. Thus, $M_i(p)$ and $N_j(e)$ may be basis functions of a spline model. $M_i(p)$ and $N_j(e)$ may be orthonormal basis functions of a smoothing spline model. $\theta$ is the collection $\theta_{ij}$ for taking integer values i,j from 1 to $N_p$. $\hat{\theta}_{ij}$ is the optimal value of each $\theta_{ij}$ that minimizes the cost function, and are thus the expansion coefficients of the smoothed model and are determined, generated, and/or updated by the above optimization process. The collection or set of optimized expansion coefficients $\hat{\theta}_{ij}$ is notated as $\hat{\theta}$.

The continuous function may be generated and/or determined by a linear expansion of the basis functions based on the expansion coefficients $$f_{\hat{\theta}}(p,e) = \sum_{i=1}^{N_p} \sum_{j=1}^{N_e} \hat{\theta}_{ij} M_i(p) N_j(e).$$

Plot 270 of FIG. 2B shows a plot of the continuous function, $f_{\hat{\theta}}(p,e)$. The continuous function may be encoded and/or indicated by signal $s_5$. Accordingly, the continuous function may be transmitted and/or provided, via signal $s_5$, to response function model 222.

The response function module 222 may generate and/or update a response function based on the continuous function and a bidding strategy. The bidding strategy may be provided via a user. A relationship between at least two independent variables of the continuous function may be determined based on the bidding strategy. For instance, a desired bid price may be determined based on an event rate, i.e. the advertiser is willing to pay more for impressions that are more likely to result in events of interest (e.g. those impressions with a higher event rate). In a linear relationship, the proportionality constant may include the value of one or more control signals, such as the control signals discussed in the '796 application. Accordingly, at least one independent variable of the continuous function may be determined (or parameterized) based on the other independent variable and the relationship between the two independent variables. Thus, the dimensionality of the response function may be decremented from than the dimensionality of each of the discrete function and the continuous function. For example, in the exemplary embodiment involving the volume-price-event relationship discussed herein, the response function module 222 may generate a one-dimension response function based on the bivariate cumulative distribution indicated or modeled via the 2D continuous function.

For example, the price variable may be represented by a control signal variable (or parameter) and the event rate variable based on the bidding strategy. The response function may be a function of the control signal variable, which includes the relationship (based on the bidding strategy) between the price and event rate independent variables and other constraints placed by the users. In such embodiments, the response function is a function of a single independent variable, the control signal variable. In such embodiments, the response function may be notated as $f_v(u)$, where u is the control signal independent variable and the subscript v refers to the cumulative volume of the campaign transactions represented via the response function. In embodiments where the response function is a one-dimensional function, the response function may be referred to as a response curve.

In various embodiments, the response function may be generated by first segmenting the domain of the continuous function. In various embodiments, the domain is segmented by the plurality of bins employed to segment the domain of the discrete function. In other embodiments, the domain may be segmented via alternative bins, grids, or meshes. The partial derivatives of the continuous function across each of the segments are determined. The basis functions employed to generate the continuous function may be employed to determine the slope of the continuous function across each of the dimensions across each of the segments. Thus, the mixed partial derivate of the continuous function ($f'_{\hat{\theta}}$) may be determined via:

$$f'_{\hat{\theta}}(p,e) = \sum_{n=1}^{N_P} N_{j=1}^{N_e} \hat{\theta}_{ij} M'_i(p) N'_j(e).$$

The response function may be determined as a linear expansion of the partial derivatives:

$$f_v(u) = \sum_{n=E_{low}}^{E_{high}} \sum_{m=P_{low}}^{P_{high}(n\Delta_e)} f'_{\hat{\theta}}(m\Delta_p, n\Delta_e)\Delta_p\Delta_e.$$

$E_{low}$, $E_{high}$, $P_{low}$, and $P_{high}$ are based on the bidding strategy. In at least one embodiment, the relationship between the price and the event rate, based on the bidding strategy is p=ue, with e≥$e_{min}$. Plot 280 of FIG. 2B shows a response curve generated based on the bidding strategy p=ue (e.g. the price for each bid is equal to the product rate of the event rate and the control signal) and the continuous function shown in plot 270.

The response function may be provided to a campaign control system, via signal $s_6$, to control an advertising campaign, as discussed in conjunction with the various embodiments of the '796 application.

Figure 5B:
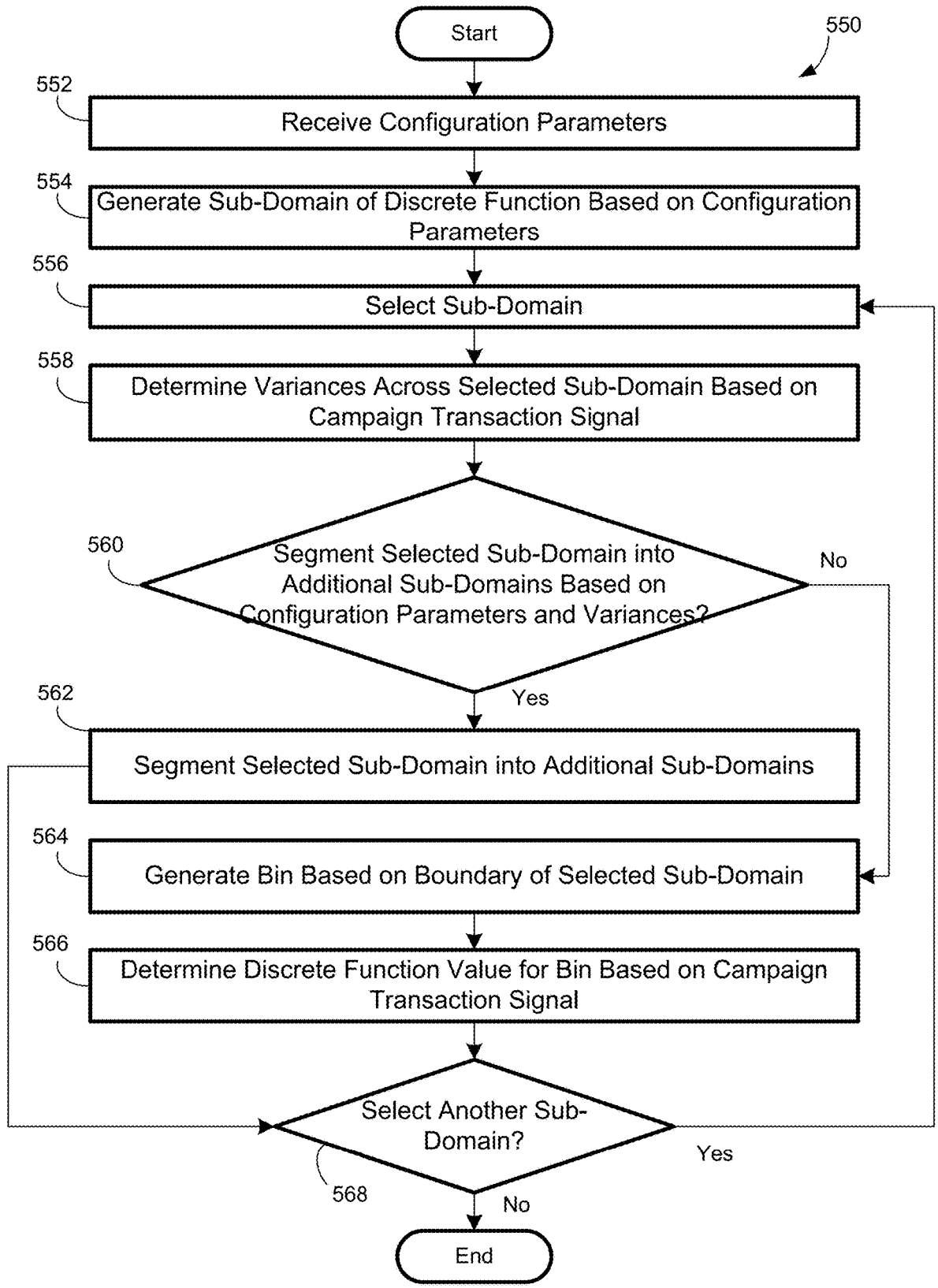
FIG. 5B depicts an illustrative process flow for recursively generating a plurality of bins for a discrete function of an online advertising campaign, in accordance with various embodiments of the present disclosure.
Figure 6A:
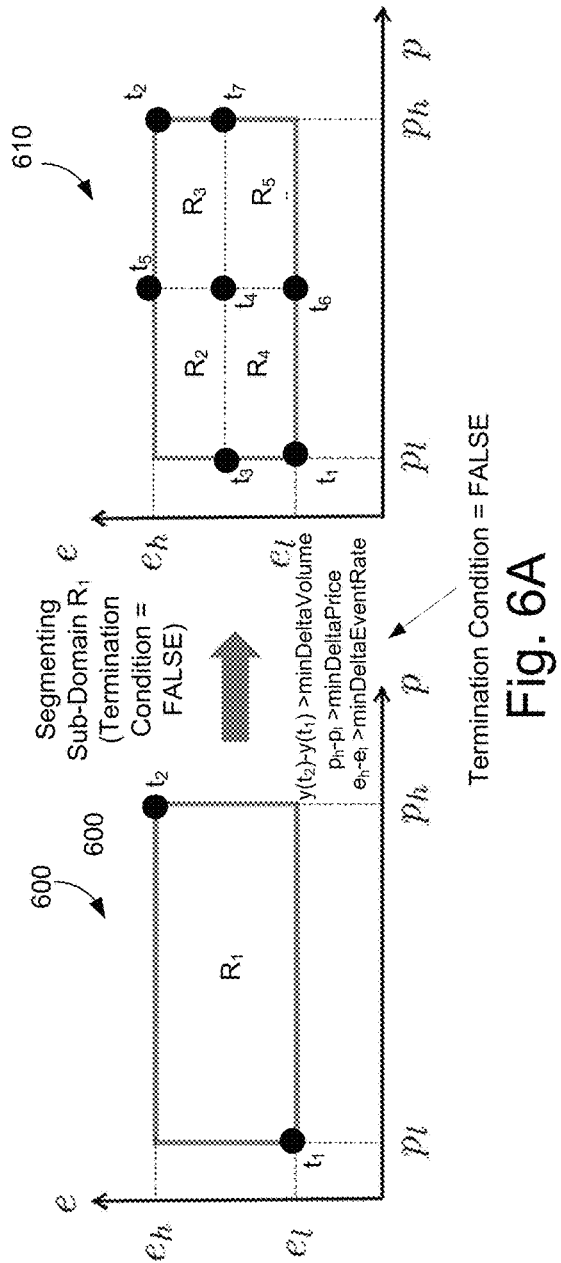
FIG. 6A depicts segmenting the domain of the discrete function into a plurality of sub-domains.
Figure 6B:
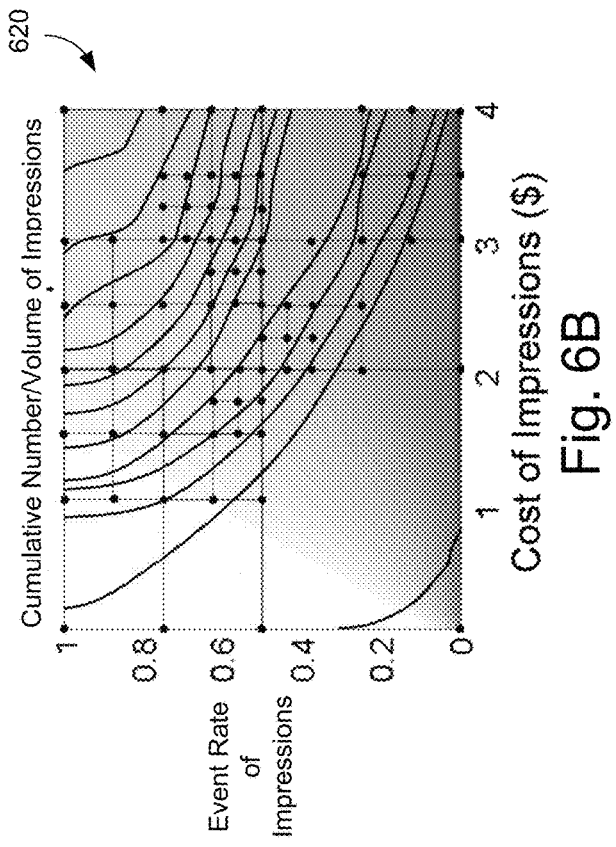
FIG. 6B depicts bins recursively generated for a discrete function, in accordance with various embodiments of the present disclosure.
Figure 6C:
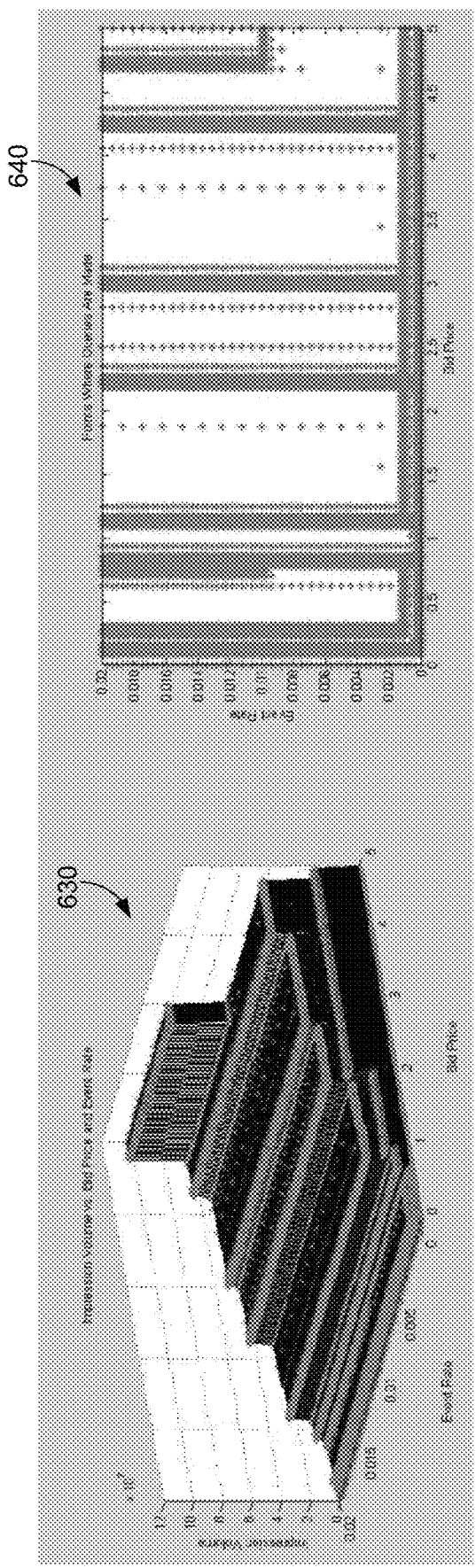
FIG. 6C depicts a recursively generated discrete function. In accordance with various embodiments of the present disclosure.
Figure 7:
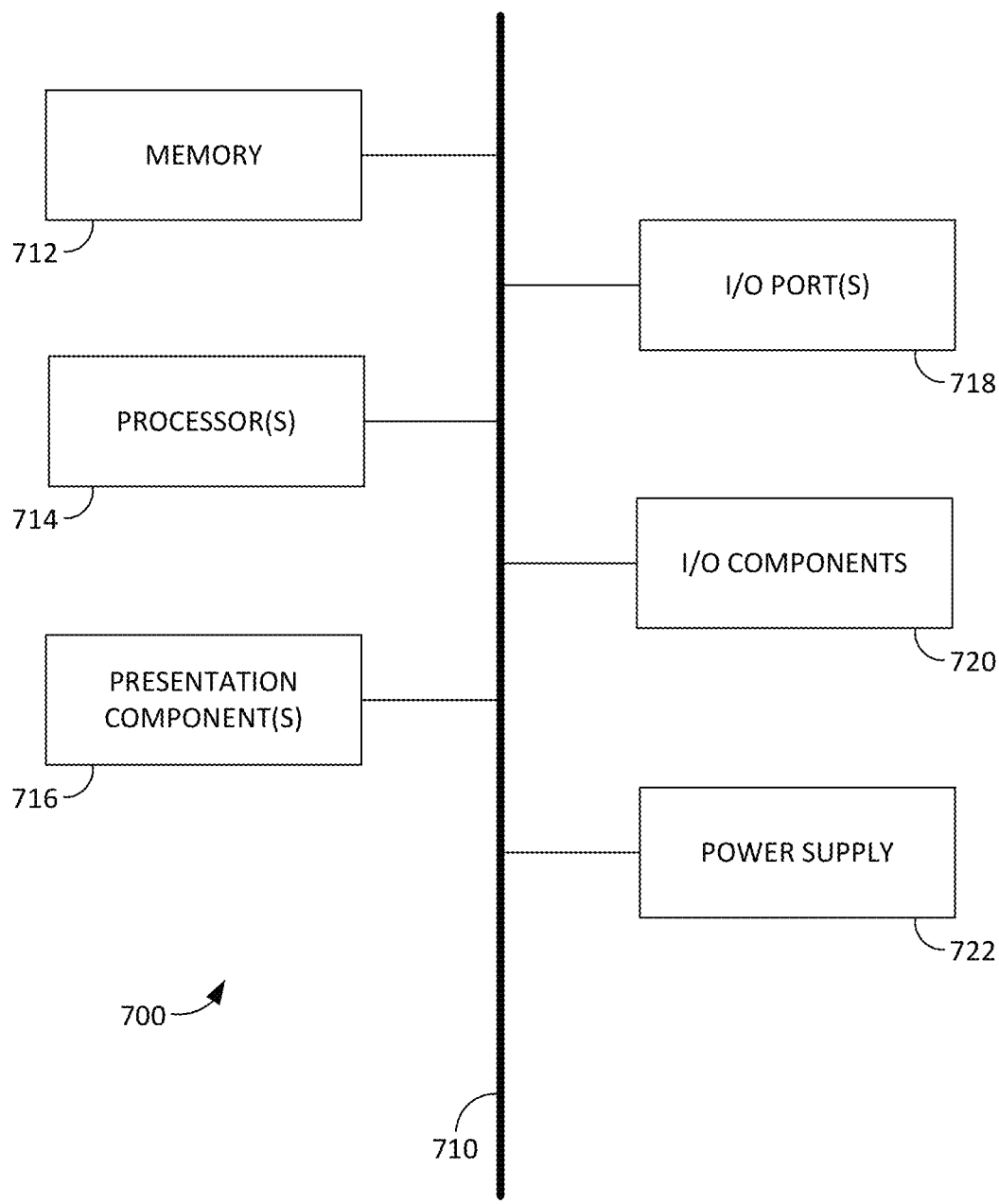
FIG. 7 is a block diagram of an example computing device in which various embodiments of the present disclosure may be employed.

Generalized Processes for Monitoring and Controlling an Online Advertising Campaign The various embodiments described in conjunction with FIGS. 4A-6C may be at least partially implemented, performed, carried out, or otherwise executed by one or more computer devices, such as but not limited to computer device 700 of FIG. 7. Furthermore, the various processes may be at least partially implemented, performed, carried out, or otherwise executed by one or more campaign monitor systems, such as but not limited to campaign monitor system 108 and/or campaign monitor system 208, a campaign control system, such as but not limited to campaign control system 120, or a combination thereof.

FIG. 4A depicts an illustrative process flow for monitoring and controlling an online advertising campaign, in accordance with various embodiments of the present disclosure. Process 400 begins, after a start block, at block 402 where a campaign transaction signal is received. In at least one embodiment, a campaign monitor system, such as but not limited to campaign monitor system 108 of FIG. 1 or campaign monitor system 208 of FIGS. 2A and 3, may receive a campaign transaction signal from an advertising network. For example, as shown in online advertising environment 200 of FIG. 2A, advertising network 204 provides campaign transaction signal $s_1$ to campaign monitor system 208. The campaign transaction signal may indicate at least a price and an event rate for each of a plurality of transactions in the advertising campaign. The transactions may include impressions that were awarded based on previous bids, as well as the associated events. The campaign transaction signal may be sampled at a plurality of successive temporal samples, resulting in a series of sampled campaign transaction signals, $s_{1,k}$, where the subscript k refers to the k-th temporal sample.

At block 404, a discrete function based on the campaign transaction signal is recursively generated. In at least one embodiment, the discrete function is updated at block 404 based on a received updated campaign transaction signal Various embodiments for recursively generating and/or updating discrete functions are discussed in conjunction with at least FIGS. 2A and 4B-5C. However, briefly here, a binning module, such as but not limited to binning module 212 may generate and/or update a discrete function based on the campaign transaction signal $s_1$. The generated/updated discrete function may be a multivariate function that indicates and/or provides a distribution of the plurality of transactions that are indicated by the campaign transaction signal. In some embodiments, the multivariate discrete function is a cumulative distribution in two or more dimensions.

At block 404, the domain of the discrete function is recursively segmented into a plurality of bins. The domain includes the applicable ranges for each of the independent variables and/or dimensions. Thus, in one exemplary embodiment, the price dimension and the rate dimension are segmented into a plurality of bins. Various embodiments of segmenting the domain of a multivariate discrete function are discussed in conjunction with FIGS. 4B-5C. However, briefly here, one or more threshold values may be employed to recursively segment each dimension and/or independent variable of the domain based on the variance of the discrete function across the recursively determined/generated domains.

In some embodiments, the discrete function may be temporally filtered at block 404. For instance, temporal filter module 214 may temporally filter the discrete function or the campaign transaction signal, $s_1$, prior to the update to the discrete function. In some embodiments, an updated discrete function corresponds to each of temporal samples, and is notated as $\bar{y}_k(p,e)$ (temporally filtered) or $y_k(p,e)$ (not temporally filtered).

At block 406, a continuous function is generated and/or updated based on the discrete function. Various embodiments for generating and/or updating a continuous function based on the discrete function are discussed in conjunction with at least FIG. 4B. However, briefly here, a smoothing module, such as but not limited to smoothing module 218 may generate/update a smoothed model ($\hat{\theta}$) of the discrete function. For instance, regression techniques, such as but not limited to multivariate splines, may be employed to generate the smoothed model. A continuous function module, such as but not limited to continuous function module 220 may generate/update a continuous function ($f_{\hat{\theta}}(p,e)$) based on the smoothed model of the discrete function.

At block 408, a response function is generated and/or updated based on the continuous function and a bidding strategy. Various embodiments for constructing a response function are discussed in conjunction with FIG. 4B. However, briefly here, a response function module, such as but not limited to response function module 222 may generate/update a response function based on the continuous function. A relationship between at least two independent variables of the continuous function may be determined based on the bidding strategy. At least one independent variable of the continuous function may be determined based on the other independent variable and the relationship between the two independent variables. Thus, the dimensionality of the response function may be reduced compared to the dimensionality of each of the discrete function and the continuous function. In some embodiments, a one-dimensional response function may be a response curve, notated as $f_v(u)$.

At block 410, impression bids are provided in the online campaign based on the response function. For instance, campaign control system 120 of FIG. 1 may be employed to use the response function to control the provided impressions based on the response curve. The campaign control system 120 may receive the response function via signal $s_6$ of FIGS. 2A and 3. Various embodiments of using a control signal, based on a response function, to control an online campaign are discussed in the '796 application. Process 400 may terminate and/or return a calling process.

FIG. 4B depicts an illustrative process flow for generating a response function of an online advertising campaign, in accordance with various embodiments of the present disclosure. Process 450 starts, after a start block, at block 452 where a campaign transaction signal is received. Various embodiments of receiving a campaign transaction signal are discussed in conjunction with process 400 of FIG. 4A. For instance, FIG. 2A shows campaign monitor system 208 receiving campaign transaction signal $s_1$ from advertising network 204. An initially received campaign transaction signal may be notated as $s_{1,0}$, where the subscript 0 refers to the first temporal sample of the received campaign transaction signal $s_1$.

At block 454, a discrete function is generated. When generating the discrete function, a plurality of bins segmenting the domain of the discrete function are recursively generated based on one or more threshold values. Various embodiments for recursively generating bins are discussed in conjunction with at least FIGS. 5A-5C. The initially generated discrete function may be notated as $y_0(p,e)$, where subscript 0 refers to the fact that the initially generated discrete function corresponds to the first temporal sample of the campaign transaction signal $s_1$.

At block 456, a continuous function ($f_{\hat{\theta}}(p,e)$) may be generated based on the discrete function. At block 458, a response function ($f_v(u)$) may be generated based on the continuous function. As noted above, the response function may be a continuous function of the control signal variable: u. At decision block 460, it is determined whether to continue to receive and/or sample the campaign transaction signal. If receiving the campaign transaction signal is terminated, process 450 proceeds to block 474 where the continuous function and/or the response function may be provided. For instance, FIGS. 2A and 3 show the continuous function being provided via signal $s_5$ and the response function being provided via signal $s_6$. In at least one embodiment, at least the response function is provided to a campaign control system. Process 450 may terminate and/or return a calling process.

If the campaign transaction signal is continued to be received, process 450 flows to block 462. At block 462, an updated campaign transaction signal, $s_{1,k}$ is received, where k refers to the k-th temporal sample and is greater than 0. At optional block 464, the updated campaign transaction signal may be temporally filtered. For instance, FIG. 3 shows the campaign transaction signal being temporally filtered via temporal filter module 214. In other embodiments, the temporal filter is not applied. At block 466, the discrete function is updated based on the temporally filtered (or unfiltered) campaign transaction signal $s_{1,k}$. In some embodiments, the updated discrete function (at the k-th temporal sample) is notated as $y_k(p,e)$. In other embodiments, the temporal filter is applied after the discrete function is updated. For instance, FIG. 2A shows the temporal filtering being applied after the updating of the discrete function.

At optional block 468, the updated discrete function may be optionally temporally filtered, as discussed throughout. Accordingly, in various embodiments, the campaign transaction signal may be temporally filtered at optional block 464 and/or the discrete function may be temporally filtered at optional block 468. At block 470, the continuous function is updated based on the updated discrete function. At block 472, the response function is updated based on the updated continuous function. Process 450 returns to decision block 460.

Processes for Recursively Generating Bins and Discrete Function

FIG. 5A depicts an illustrative process flow for generating a discrete function of an online advertising campaign, in accordance with various embodiments of the present disclosure. Process 500 is discussed in conjunction with pseudo-code 570 of FIG. 5C. FIG. 5C depicts pseudo-code 570 for the process flows of FIGS. 5A-5B.

Process 500 begins, after a start block at block 502, where the domain of the discrete function to be generated is determined. In various embodiments, the domain is determined based on a plurality of configuration parameters, such as but not limited to configuration parameters 210 of FIGS. 2A and 3. In an exemplary, but non-limiting embodiment, an upper and a lower bound for each dimension (or independent variable) of the discrete function is employed to determine the domain. The upper and lower bounds for the dimensions may be included in domain bounding-configuration parameters, as shown in pseudo-code 570. For instance, in embodiments where the discrete function is a two-dimensional function of the price and the event rate of a plurality of transactions, the applicable range of the price independent variable may be bounded by a priceLow configuration parameter and a priceHigh configuration parameter. Similarly the applicable range of the event rate independent variable may be bounded by an eventRateLow configuration parameter and an eventRateHigh configuration parameter. Accordingly, the domain of the discrete function may be bounded by the configuration parameters priceLow, priceHigh, eventRateLow, and eventRateHigh, as shown in pseudo-code 570.

At block 504, the domain of the discrete function is recursively segmented based on the campaign transaction signal received at block 402 or 452 of FIGS. 4A and 4B respectively. The segmentation of the domain may be further based on one or more thresholds values. The threshold values may be included in configuration parameters 210 of FIGS. 2A and 3. Various threshold configuration parameters, shown in pseudo-code 570, include minDeltaPrice, minDeltaEventRate, maxRelDeltaVolume, and minDeltaVolume. Various embodiments of recursively segmenting the domain are discussed in conjunction with process 550 of FIG. 5B. However, briefly here, the domain may be recursively segmented into a plurality of sub-domains based on a comparison of the variance of the discrete function over the sub-domains, the size of the sub-domains, and one or more of the threshold values. The recursive segmentation continues until one or more termination conditions or criteria are satisfied. Various termination criteria are shown in pseudo-code 570.

Furthermore, recursive function calls to segment the domain are shown in in pseudo-code 570.

At block 506, a plurality of bins for the discrete function are generated based on the segmented domain. For instance, the boundaries of each of the sub-domains generated at block 504 may serve as the boundary for the bins. In various embodiments, a bin is generated when the recursive segmentation (for the associated sub-domain) is terminated. In various embodiments, the dimensionality of the bins is equivalent to the dimensionality of the discrete function. Thus, in embodiments where the discrete function is a two-dimensional function, the bins are two-dimensional bins.

At block 508, the discrete function is generated based on the bins and the campaign transaction signal. As discussed throughout, the discrete function may indicate a cumulative impression volume as a function of the price and the event rate of the impressions. Pseudo-code 570 shows the generation of bins and the discrete function. Process 500 may terminate and/or return a calling process.

FIG. 5B depicts an illustrative process flow for recursively generating a plurality of bins for a discrete function of an online advertising campaign, in accordance with various embodiments of the present disclosure. Process 550 is discussed in conjunction with pseudo-code 570 of FIG. 5C, as well as each of FIGS. 6A-6C. FIG. 6A depicts segmenting the domain of the discrete function into a plurality of sub-domains. FIG. 6B depicts bins recursively generated for a discrete function, in accordance with various embodiments of the present disclosure. FIG. 6C depicts a recursively generated discrete function. In accordance with various embodiments of the present disclosure.

Process 550 may begin, after a start block, at block 552, where one or more configuration parameters are received. For instance, FIGS. 2A and 3 show campaign monitor system 208 receiving configuration parameters 210. As discussed in process 500 of FIG. 5A, a domain of the discrete function may be determined based on domain-bounding configuration parameters. The domain-bounding configuration parameters may provide an upper and a lower bound for each dimension (or independent variable) of the domain. Pseudo-code 570 shows domain-bounding configuration parameters for an embodiment where the discrete function is a function of the price and event rate of a plurality of impressions.

The configuration parameters may further include one or more threshold configuration parameters or values. For instance, the configuration parameters may include minimum size (or length) of the bins, in each dimension of the domain. As shown in pseudo-code 570, threshold configuration parameters minDeltaPrice and minEventRate define the minimum size of bins in the price and event rate dimensions respectively. One or more (absolute or relative) threshold values for the (absolute or relative) variance of the discrete function across the boundaries of the bins may be included in the threshold configuration parameters. Pseudo-code 570 includes maxRelDeltaVolume and minDeltaVolume as such relative and absolute threshold configuration parameters.

At block 554, one or more sub-domains of the domain may be generated. For a first iteration of process 550, a single sub-domain, which is equivalent to the domain, may be generated. Otherwise, at block 556, the domain may be considered a sub-domain. At block 556, a sub-domain is selected for recursive segmentation. During the first iteration of process 550, the single sub-domain (that is equivalent to the domain) may be selected for recursive segmentation.

Plot 600 of FIG. 6A shows a sub-domain ($R_1$) selected for recursive segmentation, where $t_1$ and $t_2$ are points in the two-dimensional domain. The points $t_1=(p_l, e_l)$ and $t_2=(p_h, e_h)$ define the boundaries of $R_1$.

At block 558, variances across the selected sub-domain are determined based on the campaign transaction signal. The determined variance may include a function variance, such as but not limited to an impression volume (or number) variance, notated in pseudo-code 570 as deltaVolume. The campaign transaction signal may be employed to determine an estimate for the discrete function value at the boundaries of the sub-domain. As used herein, the term variance may refer to a difference in values associated with two points on the domain of the sub-domain. As shown in plot 600, deltaVolume may be determined as $y(t_2)-y(t_1)$, where $y(t)$ is an estimate for the discrete function, based on the campaign transaction signal, evaluated at point t in the selected sub-domain. In some embodiments, $y(t)$ may be temporally filtered, as discussed herein.

The determined variances may further include the size (or length) of the selected sub-domain in each of the applicable dimensions of the sub-domain. In one exemplary embodiment, the variances may include deltaPrice and deltaEventRate, which correspond to the size of the price and event rate dimensions of the sub-domain. Plot 600 shows a deltaPrice variance=$p_h-p_l$ and the deltaEventRate variance=$e_h-e_l$. Pseudo-code 570 shows the determination of the discrete function values at the boundaries of the sub-domain, and the determination of the variances.

At decision block 560, it is determined whether to segment the selected sub-domain into additional sub-domains based on the configuration parameters and the variances. In at least one embodiment, the decision whether to further segment the selected sub-domain is based on one or more termination criteria. For instance, at least a portion of the variances may be compared to one or more termination criteria. The comparisons of the variances to the termination criteria may be combined via logical operations, such as but not limited to OR operations, XOR operations, AND operations, or the like. The result of such logically combined comparisons may be referred to as the termination condition, i.e. when the termination condition is TRUE, the recursive segmentation of the selected sub-domain is terminated or halted. Otherwise, when the termination condition is FALSE, the recursive segmentation is continued.

The termination criteria may be based on a comparison of one or more of the determined variances and one or more threshold configuration parameters. For instance, if the function variance across the sub-domain is greater than a threshold value (such as but not limited to minDeltaVolume), then the sub-domain may be further segmented into additional sub-domains. Otherwise, if the function variance is less than or equal to the threshold value, the recursive segmentation of the selected domain is terminated. In at least one embodiment, as shown in pseudo-code 570, the function variance may be compared to a relative threshold configuration, such as maxRelDeltaVolume, to determine a termination criteria.

Other termination criteria may include the size of the sub-domain compared to other threshold values. For instance, if the size of the sub-domain (in the price dimension) is less than minDeltaPrice, or is less than (in the event rate dimension) minDeltaEventRate, then the segmentation may be terminated (termination criteria is TRUE). Otherwise, the termination condition may be FALSE, and the segmentation of the selected sub-domain may continue. Pseudo-code 570 shows various logically combined termination criteria based on the variances and threshold value. Other embodiments may include more, less, and/or alternative termination criteria. At least a portion of the termination criteria may be logically combined via an AND operation. If the termination condition is FALSE, then process 550 proceeds to block 562. Otherwise, when termination condition is TRUE, process 560 flows to block 564.

At block 562, the selected sub-domain is segmented into additional sub-domains. When segmented into additional sub-domains, the selected sub-domain may be removed from the plurality of sub-domains. In at least some of the various embodiments, each dimension of the sub-domains is segmented into two equally size segments. In such embodiments, when the dimension of the domain is N, the segmentation of the selected sub-domain results in $2^N$ new sub-domains, and the selected sub-domain is removed from the plurality of sub-domains. In other embodiments, each dimension may be segmented into more than two segments. In at least one embodiment, the segments are not of equal size. Any segmentation scheme may be applied at block 562.

Plot 600 shows that when the termination condition is evaluated as FALSE, the sub-domain $R_1$ is segmented into additional sub-domains: $R_2$, $R_3$, $R_4$, and $R_5$. Note that the boundaries for the $R_2$ sub-domain are defined by the points $t_3$ and $t_5$, the boundaries for the $R_3$ sub-domain are defined by the points $t_4$ and $t_2$, the boundaries for the $R_4$ sub-domain are defined by the points $t_1$ and $t_4$, and the boundaries for the $R_5$ sub-domain are defined by the points $t_6$ and $t_7$. As mentioned above, other segmentation schemes may be applied. Pseudo-code 570 shows recursive function calls to segment the selected sub-domain, as shown in plot 600, when the termination condition is evaluated as FALSE.

When the termination condition is evaluated as TRUE for a selected sub-domain, process 550 flows to block 564, where a bin is generated based on the selected sub-domain. The boundaries for the generated bin may be equivalent to the boundaries of the selected sub-domain, of which the recursive segmentation was terminated. At block 566, the discrete function value for the bin is determined based on the campaign transaction signal. In at least one embodiment, the discrete function value may be a weighted average of the discrete function across the bin. The discrete function value may be associated with the bin. At decision block 568, it is determined whether another sub-domain is to be selected. If another sub-domain is to be selected, process 550 returns to block 556. When the segmentation for each sub-domain has been terminated, process 550 terminates and/or returns to a calling process.

Plot 620 of FIG. 6B shows the recursively segmented two-dimensional domain of one embodiment of a discrete function. The grid (and associated points) shows the various sub-domains (and generated bins). The resulting continuous function is plotted via grayscale on the domain. The curves represent equi-impression volume contours of the continuous function.

Plot 630 of FIG. 6C shows more exemplary embodiments of a discrete cumulative distribution. The three-dimensional surface shows the "true" distribution, while the "+" ticks provide the binned discrete distribution. The vertical position of the "+" represents the value of the discrete function, while the horizontal position (projected into the x-y plane) represents the center of the associated bin. The configuration parameters employed in the recursive binning process are also shown in FIG. 6C. Plot 640 of FIG. 6C shows the approximate center of the bins, in the two-dimensional domain. Note that a uniform binning scheme of 0.01 price-segments and 0.0001 event rate-segments would result in 100,000 bins. In contrast, the plots shown in FIG. 6C include 14,138 bins. Thus, a query of a discrete function generated via the various embodiments, would be approximately 86% more efficient than the proposed uniform binning.

Exemplary Computing Platform

Having described embodiments of the present invention, an example operating environment in which embodiments of the present invention may be implemented is described below in order to provide a general context for various aspects of the present invention. Referring to FIG. 7, an illustrative operating environment, or computing platform, for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more buses (such as an address bus, data bus, or combination thereof). Although depicted in FIG. 7, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 716 while also being one of the I/O components 720. As another example, processors have memory integrated therewith in the form of cache; however, there is no overlap between the one or more processors 714 and the memory 712. A person having ordinary skill in the art will readily recognize that such is the nature of the art, and it is reiterated that the diagram of FIG. 7 merely depicts an illustrative computing device that can be used in connection with one or more embodiments of the present invention. It should also be noticed that distinction is not made between such categories as "workstation," "server," "laptop," "hand-held device," etc., as all such devices are contemplated to be within the scope of computing device 700 of FIG. 7 and any other reference to "computing device," unless the context clearly indicates otherwise.

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media may include both volatile and/or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 700 includes one or more processors 714 that read data from various entities such as memory 712 or I/O components 720. Presentation component(s) 716 present data indications to a user or other device. Illustrative presentation components include a display device, speaker, printing component, vibrating component, etc.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternative embodiments may be practiced with only some of the described aspects. For purposes of explanation, specific numbers, materials, and configurations are set forth in order to provide a thorough understanding of the illustrative embodiments. However, it will be apparent to one skilled in the art that alternative embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method for monitoring an advertising campaign comprising:
   receiving a campaign transaction signal that indicates at least a price and a rate for each of a plurality of transactions in an advertising campaign; and
   generating a control signal associated with the advertising campaign based on the campaign transaction signal, wherein the generating comprises:
   recursively generating a discrete function based on the campaign transaction signal, wherein the discrete function indicates a discrete distribution of the plurality of transactions in a price dimension, corresponding to the price for each of the plurality of transactions, and a rate dimension, corresponding to the rate for each of the plurality of transactions, and wherein each of the price dimension and the rate dimension are non-uniformly segmented based on one or more threshold values;
   temporally filtering a current portion of the campaign transaction signal based on a previously received portion of the campaign transaction signal;
   updating the discrete function based on the temporally filtered current portion of the campaign transaction signal to generate an updated discrete function;
   generating a continuous function based on the updated discrete function, wherein the continuous function indicates a continuous distribution corresponding to the discrete distribution and is continuous in each of the price dimension and the rate dimension; and
   generating a response function based on the continuous function, wherein the response function is a function of a control variable that parameterizes a correspondence between the price dimension and the rate dimension, wherein the rate dimension is indicative of a ratio of a number of events in a group of events to a number of provided impressions, wherein the correspondence between the price dimension and the rate dimension encodes information for a specific bidding strategy employed in the advertising campaign, wherein the control signal is based on the response function.

27

2. The method of claim 1, comprising:
temporally filtering the discrete function;
determining one or more splines based on the temporally filtered discrete function; and
generating the continuous function based on the one or more splines.

3. The method of claim 1, comprising:
determining a domain of the discrete function based on one or more configuration parameters; and
recursively segmenting the domain into a plurality of sub-domains based on a comparison of the one or more threshold values and a variance of the discrete distribution of the plurality of transactions across each of the plurality of sub-domains.

4. The method of claim 1, wherein the updated discrete function is different than the discrete function.

5. The method of claim 3, comprising:
generating a plurality of non-uniform bins based on boundaries of the plurality of sub-domains; and
generating the discrete function based on the plurality of non-uniform bins.

6. The method of claim 1, wherein the plurality of transactions includes a plurality of impressions in the advertising campaign.

7. The method of claim 1, comprising:
determining a domain of the discrete function based on one or more configuration parameters; and
generating the discrete function based on the domain.

8. One or more non-transitory computer-readable media having instructions stored thereon, wherein the instructions, when executed by a processor of a computing device, cause the computing device to:
receive a campaign transaction signal that indicates at least a price and a rate for each of a plurality of transactions in an advertising campaign; and
generate a control signal associated with the advertising campaign based on the campaign transaction signal, wherein the generating comprises:
recursively generating a discrete function based on the campaign transaction signal, wherein the discrete function indicates a discrete distribution of the plurality of transactions in a price dimension, corresponding to the price for each of the plurality of transactions, and a rate dimension, corresponding to the rate for each of the plurality of transactions, and wherein each of the price dimension and the rate dimension are non-uniformly segmented based on one or more threshold values;
temporally filtering a current portion of the campaign transaction signal based on a previously received portion of the campaign transaction signal;
updating the discrete function based on the temporally filtered current portion of the campaign transaction signal to generate an updated discrete function;
generating a continuous function based on the updated discrete function, wherein the continuous function indicates a continuous distribution corresponding to the discrete distribution and is continuous in each of the price dimension and the rate dimension; and
generating a response function based on the continuous function, wherein the response function is a function of a control variable that parameterizes a correspondence between the price dimension and the rate dimension, wherein the rate dimension is indicative of a ratio of a number of events in a group of events to a number of provided impressions, wherein the correspondence between the price dimension and the rate dimension encodes information for a specific bidding strategy employed in the advertising campaign, wherein the control signal is based on the response function.

28

9. The one or more non-transitory computer-readable media of claim 8, wherein the instructions cause the computing device to:
temporally filter the discrete function; and
determine one or more splines based on the temporally filtered discrete function;
wherein the continuous function is based on the one or more splines.

10. The one or more non-transitory computer-readable media of claim 8, wherein the instructions cause the computing device to:
determine a domain of the discrete function based on one or more configuration parameters;
recursively segment the domain into a plurality of sub-domains based on a comparison of the one or more threshold values and a variance of the discrete distribution of the plurality of transactions across each of the plurality of sub-domains;
generate a plurality of non-uniform bins based on boundaries of the plurality of sub-domains; and
generate the discrete function based on the plurality of non-uniform bins.

11. The one or more non-transitory computer-readable media of claim 8, wherein the updated discrete function is different than the discrete function.

12. The one or more non-transitory computer-readable media of claim 8, wherein the correspondence between the price dimension and the rate dimension encodes information for a specific bidding strategy employed in the advertising campaign.

13. The one or more non-transitory computer-readable media of claim 8, wherein the plurality of transactions includes a plurality of impressions in the advertising campaign.

14. The one or more non-transitory computer-readable media of claim 8, wherein the instructions cause the computing device to:
provide a plurality of bids in the advertising campaign based on the response function.

15. A system for monitoring an advertising campaign comprising:
a processor device; and
a computer-readable storage medium, coupled with the processor device, having instructions stored thereon, which, when executed by the processor device, cause the system to perform actions comprising:
receiving a campaign transaction signal that indicates at least a price and a rate for each of a plurality of transactions in an advertising campaign; and
generating a control signal associated with the advertising campaign based on the campaign transaction signal, wherein the generating comprises:
recursively generating a discrete function based on the campaign transaction signal, wherein the discrete function indicates a discrete distribution of the plurality of transactions in a price dimension, corresponding to the price for each of the plurality of transactions, and a rate dimension, corresponding to the rate for each of the plurality of transactions, and wherein each of the price dimension and the rate dimension are non-uniformly segmented based on one or more threshold values;

temporally filtering a current portion of the campaign transaction signal based on a previously received portion of the campaign transaction signal;

updating the discrete function based on the temporally filtered current portion of the campaign transaction signal to generate an updated discrete function;

generating a continuous function based on the updated discrete function, wherein the continuous function indicates a continuous distribution corresponding to the discrete distribution and is continuous in each of the price dimension and the rate dimension; and generating a response function based on the continuous function, wherein the response function is a function of a control variable that parameterizes a correspondence between the price dimension and the rate dimension, wherein the control signal is based on the response function.

16. The system of claim 15, wherein the actions comprise:
temporally filtering the discrete function;
determining one or more splines based on the temporally filtered discrete function; and
generating the continuous function based on the one or more splines.

17. The system of claim 15, wherein the actions comprise:
determining a domain of the discrete function based on one or more configuration parameters;
recursively segmenting the domain into a plurality of sub-domains based on a comparison of the one or more threshold values and a variance of the discrete distribution of the plurality of transactions across each of the plurality of sub-domains;
generating a plurality of non-uniform bins based on boundaries of the plurality of sub-domains; and
generating the discrete function based on the plurality of non-uniform bins.

18. The system of claim 15, wherein the updated discrete function is different than the discrete function.

19. The system of claim 15, wherein the correspondence between the price dimension and the rate dimension indicates a bidding strategy to employ in the advertising campaign.

20. The system of claim 15, wherein the plurality of transactions includes a plurality of impressions in the advertising campaign.

* * * * *